(12) United States Patent
Upadhyay et al.

(10) Patent No.: US 11,494,271 B2
(45) Date of Patent: Nov. 8, 2022

(54) DYNAMICALLY UPDATING DATABASE ARCHIVE LOG DEPENDENCY AND BACKUP COPY RECOVERABILITY

(71) Applicant: EMC IP Holding Company LLC, Hopkinton, MA (US)

(72) Inventors: Navneet Upadhyay, Ghaziabad (IN); Rejith Mohan M, Thiruvanathapuram (IN); Amith Ramachandran, Bangalore (IN); Shelesh Chopra, Bangalore (IN); Yasemin Ugur-Ozekinci, Oakville (CA); Ken Owens, Burlington (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 199 days.

(21) Appl. No.: 17/076,468

(22) Filed: Oct. 21, 2020

(65) Prior Publication Data
US 2022/0121527 A1  Apr. 21, 2022

(51) Int. Cl.
*G06F 12/00* (2006.01)
*G06F 11/14* (2006.01)
(Continued)

(52) U.S. Cl.
CPC ...... *G06F 11/1451* (2013.01); *G06F 11/1435* (2013.01); *G06F 11/1469* (2013.01);
(Continued)

(58) Field of Classification Search
CPC ............ G06F 11/1446; G06F 11/1448; G06F 11/1451; G06F 11/1453; G06F 11/1456; G06F 11/1458; G06F 11/1461; G06F 11/1464; G06F 11/1466; G06F 11/1469; G06F 11/1471; G06F 11/2053; G06F 11/2094; G06F 11/2092; G06F 11/2089;
(Continued)

(56) References Cited

U.S. PATENT DOCUMENTS

| | | | |
|---|---|---|---|
| 8,838,539 B1 * | 9/2014 | Ashcraft | H04L 67/01 707/637 |
| 10,452,680 B1 * | 10/2019 | Fan | G06F 16/27 |
| 2020/0327015 A1 * | 10/2020 | Vargas | G06F 11/1471 |

* cited by examiner

*Primary Examiner* — Arvind Talukdar
(74) *Attorney, Agent, or Firm* — Dergosits & Noah LLP; Todd A. Noah

(57) ABSTRACT

System extracts metadata of system committed change numbers, system change numbers for backup copies. System generates start system change numbers as minimums of committed change numbers, end system change numbers as maximums of change numbers, and identifiers for archive log backup copies. System identifies dependent system change numbers from start number to end number for backup copy. System identifies backed-up system change numbers, from start numbers to end numbers for log backup copies, which are in dependent numbers. If backed-up numbers don't include all dependent numbers, system outputs missing system change numbers. System generates start numbers, end numbers, and identifiers for new archive log backup copies, identifies new backed-up system change numbers, from start numbers to end numbers for new log backup copies, which are in missing numbers. If new backed-up numbers include all missing numbers, system stores backup copy with each log backup copy corresponding to any backed-up numbers.

20 Claims, 4 Drawing Sheets

(51) Int. Cl.
*G06F 16/21* (2019.01)
*G06F 21/62* (2013.01)

(52) U.S. Cl.
CPC ........ *G06F 11/1471* (2013.01); *G06F 16/219* (2019.01); *G06F 21/6227* (2013.01); *G06F 11/1446* (2013.01); *G06F 11/1448* (2013.01); *G06F 11/1464* (2013.01); *G06F 2201/80* (2013.01)

(58) Field of Classification Search
CPC ............. G06F 11/2087; G06F 11/2084; G06F 11/2082; G06F 11/2079; G06F 11/2076; G06F 11/2074; G06F 11/2071; G06F 11/2069; G06F 11/2066; G06F 11/2064; G06F 11/2058; G06F 11/2056; G06F 11/2061
See application file for complete search history.

DYNAMICALLY UPDATING DATABASE ARCHIVE LOG DEPENDENCY AND BACKUP COPY RECOVERABILITY

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A data object may be stored on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

A backup/restore application can create a full backup copy for a data object by backing up all of the data in the data object. A full backup copy may be created at infrequent intervals and can serve as a reference point for subsequent incremental cumulative backup copies, incremental differential backup copies, and/or transaction log backup copies. A backup/restore application can create an incremental cumulative backup copy for a data object by backing up all of the data that has changed in the data object since the last full backup copy was created for the data object. As the elapsed time increases since the most recent full backup copy, the accumulated changes increase in a data object, as does the time to create an incremental cumulative backup copy. A backup/restore application can create an incremental differential backup copy for a data object by backing up only data that is new or changed in the data object since the most recent previous backup copy was created, which may have been a full backup copy, an incremental cumulative backup copy, or another incremental differential backup copy. Since an incremental differential backup copy does not store duplicate copies of unchanged data, a system can efficiently store more backup copies created at more points in time by organizing the data into increments of change between points in time.

A backup/restore application can create a transaction log backup copy for a data object by only backing up a history of actions executed by the data object's management system. The data object's management system can use a transaction log backup copy to re-apply the changes made by committed transitions that are not materialized in a data object and roll back the changes to a data object that were made by uncommitted transactions. A transaction log may be referred to as a redo log, and a stored copy of a transaction log may be referred to as an archive redo log, an archive log, or an archive log backup copy.

A backup/restore application can use an application data manager that requests application data management agents on application hosts to discover the application resources that are stored on these hosts, such as discovering the application host configurations (which may be referred to as application servers), the file systems, the applications, the databases, and the copy metadata of all backups on all application hosts. After discovering these application resources, the application data management agents can send copies of these application resources and information about these application resources to the requesting application data manager.

A backup copy of/for a data object may depend on another backup copy of the data object when the backup copy is used to restore or recover the data object to a previous state of the data object. For example, an incremental cumulative backup copy of a database depends upon the preceding full backup copy of the database because data from the incremental cumulative backup copy needs to be combined with data from the preceding full backup copy to restore or recover the database to the state of the database at the time that the incremental cumulative backup copy was created. In this example, the incremental cumulative backup copy may be referred to as a dependent backup copy because it depends on another backup copy, the full backup copy may be referred to as a base backup copy because another backup copy depends on it by using it as a basis for the recovery. In similar examples, an archive log backup copy may depend on the preceding full backup copy and therefore may be referred to as a dependent backup copy. For some types of databases, a full backup copy of the database may be referred to as an independent backup copy because the data from the full backup copy does not need to be combined with anything from any other backup copy to restore the database to the state that the database was in at the time that the full backup copy was created. However, for other types of databases, a full backup copy of the database may be referred to as an dependent backup copy because the data from the full backup copy needs to be combined with something from another backup copy to restore the database to the state that the database was in at the time that the full backup copy was created.

For example, a database administrator schedules a full backup copy of an Oracle database from 7:30 P.M. to 11:30 P.M., and archive log backup copies for the Oracle database every 15 minutes from 7:30 P.M. to 11:30 P.M. When a backup/restore application creates a backup copy of an Oracle database that is currently being accessed by system users who are in different stages of committing transactions to the database, the backup copy stores data that is considered to be in a fuzzy state because only some of the users' transactions have been committed when the creation of the "hot" backup copy is complete. Therefore, a hot backup copy depends upon corresponding archive log backup copies that contain the transaction logs in order to perform a recovery of the Oracle database to the state of the Oracle database at the time that the hot backup copy was created. Consequently, if the backup/restore application replicates only the full backup copy of the Oracle database or moves only the full backup copy of the Oracle database to a cloud tier, the full backup copy of the Oracle database would be useless for restoring the Oracle database without the full backup copy's corresponding archive log backup copies.

Different databases and application may use different algorithms and parameters to identify dependent backup copies. For example, a backup server which replicates and moves backup copies uses different algorithms to identify dependent backup copies for different types of applications' databases. Each application host sends application-specific data to the backup server, which stores the application-specific data and analyzes the application-specific data to identify dependent backup copies for each application's database. For example, during backup discovery for an Oracle database, an application host sends the database incarnation number, the copy number, and the range of the system change numbers for each backup copy to the backup server, which stores all of this metadata for its corresponding backup copy, and uses the metadata to identify which backup copies are dependent on other backup copies.

When a backup server is identifying which backup copies for a database depend on which other backup copies for the database, and creates a backup copy for the database at the same time or a future time, the backup server may not be able to identify that the backup copy created at the same time or a future time is a backup copy that another backup copy depends on. For example, a backup server creates a full backup copy of an Oracle database from 7:30 P.M. to 11:30 P.M., and is scheduled to create an archive log backup copy of the Oracle database at 1:00 A.M., and discovers the full backup copy at 11:45 P.M. If the backup server replicates only the full backup copy of the Oracle database or moves only the full backup copy of the Oracle database to a cloud tier, the full backup copy of the Oracle database would be useless for restoring the Oracle database without its corresponding archive log backup copy that is scheduled to be created at 1:00 A.M., following a lag after 11:30 P.M. Even if the backup server created multiple archive log backup copies for the Oracle database between 7:30 P.M. and 11:30 P.M., the backup server may be able to identify only some of the archive log backup copies that the full backup copy depends upon, but not all of the archive log backup copies required to restore the Oracle database to the state of the Oracle database at the time that the full backup copy was created.

An application error may prevent a backup server from identifying dependent backup copies. For example, even if all of the archive log backup copies are scheduled to be created before the full backup copy is completed at 11:30 P.M., an application error may delay the creation of some of the required archive log backup copies until after 11:30 P.M., such the full backup copy would be useless for restoring the database until the error-delayed archive log backup copy is completed. Additionally, if a backup server creates a full backup copy and some of the archive log backup copies for an Oracle database supported by the first node in a cluster before the first node becomes unavailable, and then a lag-scheduled or error-delayed archive log backup copy is created for the Oracle database supported by the second node in the cluster, the backup server may not be able to identify any dependencies between backup copies created from different cluster nodes. Consequently, the backup server may indicate that a backup copy of a database has been created, but the backup server should delay using the backup copy to restore the database to the state of the database at the time that the backup copy was created, until a lag-scheduled or error-delayed archive log backup copy is created at some future time. Therefore, the backup server should not use a backup copy for recovery, replication, or moving until the backup copy's incomplete dependencies are resolved.

If a system user manually deletes some of an Oracle database's archive logs which have not been backed up yet, due to disk space limitations, and then runs a crosscheck, any subsequently created archive log backup copy for the Oracle database will not enable the correct recovery of the Oracle database due to missing transactions that were contained in the deleted archive logs. If the system administrator knew that any subsequent archive log backup copy would be incomplete, they could take a corrective measure, such as by executing a full backup copy of the Oracle database, instead of continuing to follow a schedule for executing a sequence of incremental backup copies.

DETAILED DESCRIPTION

Figure 1:
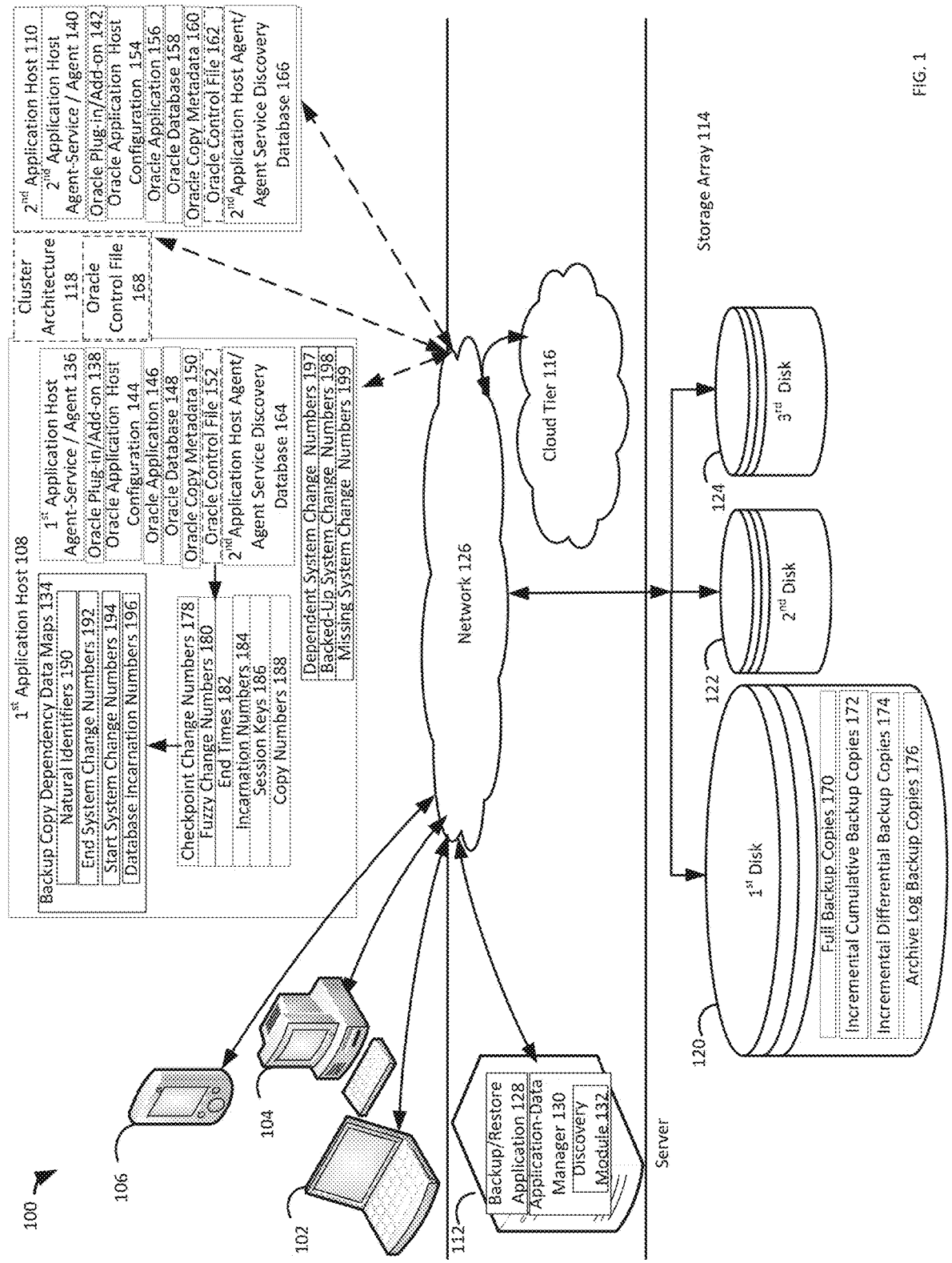
FIG. 1 illustrates a block diagram of an example system for dynamically updating database archive log dependencies and backup copy recoverability, under an embodiment.

The metadata for backup copies which application hosts send to a backup server can not only increase the data being received by the backup server for every backup copy but also require additional storage space on the backup server, which may receive this metadata from thousands of application hosts. Furthermore, identifying dependent backup copies from this received metadata can be an intensive workflow for central processing units, which significantly slows the overall functioning of the backup server.

If a backup server cannot use a backup copy of a database for recovery, replication, or moving because the backup copy depends on archive logs that are not protected by archive log backup copies, then the database that was supposed to be protected by the backup copy will remain unprotected by the backup copy until the backup server can verify that the unprotected archive logs are protected. Consequently, if the backup server waits until periodic discoveries eventually verify that one or more archive log backup copies have been created that protect the previously unprotected archive logs, then the database may remain unprotected even after the archive log backup copies have been created. Instead, if the statuses of the backup copy's dependencies on archive logs are dynamically updated, then that the backup server can use the backup copy as soon as possible for the intended recovery, replication, or moving.

Embodiments herein enable dynamically updating database archive log dependencies and backup copy recoverability. A system extracts backup metadata, comprising system committed change numbers, system change numbers, types, database version identifiers, and details, for backup copies. The system generates a data structure, comprising start system change numbers, based on the minimums of the system committed change numbers, end system change numbers, based on the maximums of the system change numbers, the database version identifiers, and identifiers including the details, for a set of archive log backup copies. The system identifies dependent system change numbers, based on a start system change number to an end system change number for a backup copy corresponding to a database version identifier. The system identifies, in the data structure, a set of backed-up system change numbers, based on the start system change numbers to the end system change numbers for the set of archive log backup copies corresponding to the database version identifier, which are included in the dependent system change numbers.

If the set of backed-up system change numbers do not include all of the dependent system change numbers, then the system outputs identifiers of the dependent system change numbers that are missing from the backed-up system change numbers as missing system change numbers. The system regenerates the data structure for an updated set of archive log backup copies. The system identifies, in the regenerated data structure, a updated set of backed-up system change numbers, based on the start system change numbers to the end system change numbers for the updated set of archive log backup copies corresponding to the database version identifier, which are included in the missing system change numbers. If the updated set of backed-up system change numbers include all of the missing system change numbers, then the system stores the backup copy with each archive log backup copy which corresponds to any set of backed-up system change numbers in recovery storage.

For example, while node #2 in a 2-node cluster is unavailable, node #1's Oracle Plug-in or Add-on accesses an Oracle control file and identifies information about a full backup copy of node #2's Oracle database created from 7:30 P.M. to 11:30 P.M. on April 15$^{th}$, an archive log backup copy of node #2's Oracle database created from 8:15 P.M to 8:30 P.M. on April 15$^{th}$, and an archive log backup copy of node #2's Oracle database created from 10:15 P.M to 10:30 P.M. on April 15$^{th}$. The Oracle Plug-in or Add-on extracts the database version identifiers for the backup copies, generates the backup copies' natural identifiers, calculates the start system change numbers as the minimums of the system committed change numbers for the backup copies, and calculates the end system change numbers as the maximums of the system change numbers for the backup copies. The Oracle Plug-in or Add-on creates a map that uses the database version identifiers of the archive log backup copies as the key and uses other maps as the values. The other maps use the end system change numbers of the archive log backup copies as their keys and use the start system change numbers and the natural identifiers of the archive log backup copies as their values.

The Oracle Plug-in or Add-on identifies that the full backup copy depends on the archive logs corresponding to the system change numbers 1578 to 1594, based on the start system change number 1578 to the end system change number 1594 for the full backup copy. The Oracle Plug-in or Add-on uses the shared database version identifier for the full backup copy and the April 15$^{th}$ archive log backup copies to access the map and identify the start system change number 1578 to the end system change number 1582 for April 15$^{th}$'s first archive log backup copy, which are included in the full backup copy's dependent system change numbers 1578-1594. The Oracle Plug-in or Add-on also identifies the start system change number 1586 to the end system change number 1590 for April 15$^{th}$'s second archive log backup copy, which are included in the full backup copy's dependent system change numbers 1578-1594. Collectively, the Oracle Plug-in or Add-on identifies the backed-up system change numbers 1578-1582 and 1586-1590 which are included in the full backup copy's dependent system change numbers 1578-1594. Since the backed-up system change numbers 1578-1582 and 1586-1590 do not include all of the full backup copy's dependent system change numbers 1578-1594, the Oracle Plug-in or Add-on reports the statuses of the full backup copy as unrecoverable and mutable, reports the identifiers of the April 15$^{th}$'s archive log backup copies, and reports the missing system change numbers 1583-1585 and 1591-1594. The unrecoverable status prevents a backup/restore application from replicating and/or moving the full backup copy, and the mutable status prevents the backup/restore application from protecting the full backup copy from being modified by any updates received for the full backup copy. If the backup/restore application replicated only the full backup copy of the Oracle database or moved only the full backup copy of the Oracle database to a cloud tier, the full backup copy of the Oracle database would be useless for restoring the Oracle database without the full backup copy's corresponding archive logs that are missing from the archive log backup copies.

The Oracle Plug-in or Add-on reports that the full backup copy is missing the backup copies of the archive logs corresponding to the system change numbers 1583-1585 and 1591-1594, because the backed-up system change numbers 1578-1582 and 1586-1590 do not include all of the full backup copy dependent system change numbers 1578-1594. The Oracle Plug-in or Add-on regenerates the map to incorporate system change numbers and identifiers of archive log backup copies subsequently created on April 16$^{th}$. The Oracle Plug-in or Add-on uses the shared database version identifier for the full backup copy and the April 16$^{th}$ archive log backup copies to access the map and identify the start system change number 1591 to the end system change number 1594 for April 16$^{th}$'s first archive log backup copy, which are included in the missing system change numbers 1583-1585 and 1591-1594. The Oracle Plug-in or Add-on also identifies the start system change number 1583 to the end system change number 1590 for April 16$^{th}$'s second archive log backup copy, which are in the missing system change numbers 1583-1585 and 1591-1594. Collectively, the Oracle Plug-in or Add-on identifies the backed-up system change numbers 1583-1585 and 1591-1594 which are included in the missing system change numbers 1583-1585 and 1591-1594.

Since the collective backed-up system change numbers 1578-1594 include all of the full backup copy's dependent system change numbers 1578-1594, the Oracle Plug-in or Add-on reports the statuses of the full backup copy as recoverable and immutable, reports the identifiers of the April 16$^{th}$'s archive log backup copies, and does not report any missing system change numbers for archive logs. The recoverable status and the identifiers of the April 16$^{th}$'s archive log backup copies enables a backup/restore application to replicate and/or move the full backup copy with the April 15$^{th}$ and 16$^{th}$ archive log backup copies which corresponds to the backed-up system change numbers 1578-1594, and the immutable status enables the backup/restore application to protect the full backup copy from being modified by any updates received for the full backup copy.

FIG. 1 illustrates a diagram of a system 100 for dynamically updating database archive log dependencies and backup copy recoverability, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, a fourth client 108, and a fifth client 110; and a server 112, a storage array 114, and a cloud tier 116 that may be provided by a hosting company. If the fourth client 108 and the fifth client 110 are in a cluster, such as an Oracle Real Application Cluster, then the clients 108 and 110 are connected by cluster architecture 118, and may be referred to as a first cluster node 108 and a second cluster node 110. The storage array 114 includes a first disk 120, a second disk 122, and a third disk 124. The clients 102-110, the server 112, the storage array 114, the cloud tier 116, and the optional cluster architecture 118 communicate via a network 126.

Although FIG. 1 depicts the first client 102 as a laptop computer 102, the second client 104 as a personal computer 104, the third client 106 as a smartphone 106, the fourth client 108 as an application host 108, and the fifth client 110 as an application host 110, each of the clients 102-110 may be any type of computer. Even though FIG. 1 depicts the system 100 with five clients 102-110, one server 112, one storage array 114, one cloud tier 116, one cluster architecture 118, three disks 120-124, and one network 126, the system 100 may include any number of clients 102-110, any number of servers 112, any number of storage arrays 114, any number of cloud tiers 116, any number of cluster architectures 118, any number of disks 120-124, and any number of networks 126. The clients 102-110 and the server 112 may each be substantially similar to the system 300 depicted in FIG. 3 and described below.

The server 112, which may be referred to as a backup server 112, includes a backup/restore application 128 that can create backup files of data objects for the clients 102-110, and execute a restore based on the backup files stored on the storage array 114 and/or the cloud tier 116. The backup/restore application 128 can provide centralized administration, such as scheduling, monitoring, and managing backup operations and backup files. The backup/restore application 128 can enable the storing of backup operation schedules, client policies, and client configurations. The backup/restore application 128 can provide a unique interface to the clients 102-110 during login, and also assist the backup server 112 in authenticating and registering the clients 102-110. The backup/restore application 128 can send backup/restore work orders to the clients 102-110, which can receive and process the work orders to start a backup or restore operation. The backup/restore application 128 can maintain a local database of all processes that execute on the backup server 112. The backup/restore application 128 can execute server-side processes for a system administrator's graphical management console, which may enable the system administrator to use command line interface tools for queries. For example, a system administrator identifies the clients 102-110 registered with the backup server 112.

The backup server 110 also includes an application data manager 130, which includes a discovery module 132 and possibly includes backup copy dependency data maps 134. As described below, the backup/restore application 128 can use the application data manager 130 to backup data objects and restore data objects, and use the discovery module 132 to request for clients to discover data for their application resources. As also described below, the application data manager 130 can use the discovery module 132 to access the clients 108 and/or 110 to generate the backup copy dependency data maps 134. FIG. 1 depicts the backup/restore application 128 and the application data manager 130 residing completely on the backup server 112, but the backup/restore application 128 and/or the application data manager 130 may reside in any combination of partially on the backup server 112, partially on another server which is not depicted in FIG. 1, and partially on the clients 102-110.

Using a generic data model and discovery protocol, the application data manager 130 can discover data for application resources via an application host agent-service which can generically use an add-on to discover data for different application resources on the clients 102-110. Alternatively, using application vendor-specific logic, the application data manager 130 can discover data for application resources via an application host agent which can use a vendor-specific plug-in to discover data for different application resources and their backup copies on the clients 102-110. Therefore, the application data manager 130 can discover data for application resources via a first application host agent-service or agent 136 which can use an Oracle Plug-in or Add-on 138 to discover data for the application resources on the first application host 108, and discover data for application resources via a second application host agent-service or agent 140 which can use an Oracle Plug-in or Add-on 142 to discover data for the application resources on the second application host 110. Although FIG. 1 does not depict the following components, the application data manager 130 can discover data for application resources via a laptop agent-service or agent which can use a SQL Plug-in or Add-on to discover data for the application resources on the laptop computer 102, and discover data for application resources via a smartphone agent-service or agent which can use a Microsoft Outlook Plug-in or Add-on to discover data for the application resources on the smartphone 106.

In an example using the generic data model, after registering the first application host 108, the application data manager 130 can discover data for application resources on the first application host 108 via the first application host agent-service 136 which can use the Oracle add-on 138 to discover data for an Oracle application host configuration 144, an Oracle application 146, an Oracle database 148, Oracle copy metadata 150, and an Oracle control file 152. A control file can be a small binary collection of data that records the physical structure of a database, and can include the database name, the names and locations of associated datafiles and online redo log files, the timestamp of the database creation, the current log sequence number, and checkpoint information. In another example using the generic data model, after registering the second application host 110, the application data manager 130 can discover data for application resources on the second application host 110 via the second application host agent-service 140 which can use the Oracle add-on 142 to discover data for an Oracle application host configuration 154, an Oracle application 156, an Oracle database 158, Oracle copy metadata 160, and an Oracle control file 162. The first application host agent-service 136 may store its discovered data in a first application host agent service discovery database 164, and the second application host agent-service 140 may store its discovered data in a second application host agent service discovery database 166. If the fourth client 108 and the fifth client 110 are the first cluster node 108 and the second cluster node 110 in a cluster, such as an Oracle Real Application Cluster, then the nodes 108 and 110 are connected by the cluster architecture 118 and share an Oracle control file 168, instead of having their own independent Oracle control files 152 and 162, respectively. In some embodiments, the discovery module 132 can use one component for discovering application resources other than copies of metadata, such as the databases 148 and 158, and use another component dedicated to discovering copies of metadata, such as the copy metadata 150 and 160.

Although FIG. 1 does not depict the following components, after registering the smartphone 106, the application data manager 130 can discover data for application resources on the smartphone 106 via the smartphone agent-service which can use a Microsoft® Outlook add-on to discover data for a Microsoft® Outlook application host configuration, a Microsoft® Outlook application, a Microsoft® Outlook database, and Microsoft® Outlook copy metadata, and store the discovered data in a smartphone discovery database. Similarly, after registering the laptop computer 102, the application data manager 130 can discover data for the application resources on the laptop computer 102 via a laptop computer host agent which can use a SQL Plug-in to discover data for a SQL application host configuration, a SQL application, a SQL database, and SQL copy metadata and store the discovered data in a laptop discovery database.

FIG. 1 depicts the system 100 with two clients 108-110 that communicate via two agent-services or agents 136 and 140 which use two Add-ons or Plug-ins 138 and 142 to discover data for eight application resources 144-162 for two applications 146 and 156, and store discovered data in two discovery databases 164 and 166. However, the system 100 may include any number of clients 102-108 that communicate via any number of agent-services or agents 136 and 140 which use any number of Add-ons or Plug-ins 138 and 142 to discover data for any number of application resources 144-162 for any number of applications 146 and 156, and store discovered data in any number of discovery databases 164 and 166.

After an application host 108 or 110 discovers an application resource and creates a backup copy of an application resource, the backup server 112 can request the application host 108 or 110 to move the short-term retention backup copy to the backup server 112 for long-term retention. For example, the application data manager 130 makes a REST application programming interface call to the application host agent-services 136 to move the backup copy of the Oracle database 148 from the application host 108. Following receipt of a request to move a backup copy of an application resource, an application host 108 or 110 can move a short-term retention backup copy to the backup server 112 for long-term retention. For example, the application host agent-services 136 moves the backup copy of the Oracle database 148 from the application host 108 to the application data manager 130, which stores the backup copy of the Oracle database 148 in the first disk 120. While the application host 108 has limited capacity for storing the short-term backup copies, the storage array 114 has capacity for storing the long-term backup copies on a long-term basis. The backup/restore application 128 can also store metadata for a database and its transaction logs in remote storage. For example, the storage array 114 stores the metadata for a full backup copy and an archive log backup copy for the Oracle database 148.

Then the Oracle Plug-in or Add-on 138 and/or 142 can receive information about backup copies, generate the backup copy dependency data maps 134 for archive log backup copies, and subsequently use the backup copy dependency data maps 134 to identify database archive log dependencies and backup copy recoverability. The copy discovery output provides all the information about the backup copies that the backup/restore application 128 has created, which are mainly grouped based on their backup copy types, such as full backup copies 170, incremental cumulative backup copies 172, incremental differential backup copies 174, and archive log backup copies 176, which are depicted as stored in the first disk 120 of the storage array 114, but which may be stored in any of the disks 120-124 or the cloud-tier 116. The full backup copies 170, the incremental cumulative backup copies 172, and the incremental differential backup copies 174 have no relevance on their own because they need information about the archive log backup copies 176 that they depend upon to restore a data object to the state of the data object at the time that the backup copies 170-174 were created. A type can be a category of information about data objects or duplicates of data objects.

A full backup copy 170 can be a duplicate of all data in a data object. An incremental cumulative backup copy 172 can be a duplicate of all data that has changed in a data object since the last duplicate was created of all data in the data object. An incremental differential backup copy 174 can be a duplicate of only data that is new or changed in a data object since the most recent previous duplicate was created of data in the data object. An archive log backup copy 176 can be a duplicate of the history of some actions executed by a data object's management system.

A backup server 112 may begin the process of retrieving information about the backup copies 170-176 by outputting a discovery request for an application's resources to the application's host. For example, the backup server 112 executes the discovery module 132 in the application data manager 130, which makes REST (Representational State Transfer) application programming interface calls to request the agent-services or agents 136 and 140 that are executing on the clients 108 and 110, which may be referred to as the application hosts 108 and 110, to discover their application resources. Examples of the application resources include the Oracle application host configurations 144 and 154, the Oracle applications 146 and 156, the Oracle databases 148 and 158, the Oracle copy metadata 150 and 160 of backup copies for the clients 108 and 110, the Oracle control files 152 and 162 or the Oracle control file 168, and any corresponding file systems.

A backup server can be a computer that executes computer programs which assist client devices in storing copies of data objects for retention within dedicated files. Information can be data as processed, stored, or transmitted by a computer. A backup copy can be a record of at least some of the information needed to restore a data object to a state at a specific time when the information was recorded. A discovery request can be a solicitation to identify application resources. An application resource can be an asset used by a program that executes a particular task or set of tasks. An application host can be a computer that executes a computer program that performs a particular task or set of tasks.

Alternatively, the agent-services or agents 136 and 140 independently discover the application resources 144-162 on the clients 108 and 110, without having received any discovery request from the application data manager's discovery module 132. In this way, the agent-services or agents 136 and 140 are resilient to transient issues, such as unavailability of the application data manager 130 or an error on the network 126.

During copy discovery, the system 100 receives backup copy dependency data about the backup copies 170-176 from a database management system. For example, during copy discovery the Oracle Plug-in or Add-on 138 and/or 142 queries various views of the Oracle control file(s) 152 and/or 162 or 168 to retrieve information about the Oracle backup copies 170-176 and uses the retrieved information to identify backup copy dependency data. Although this disclosure describes examples of the system 100 using an Oracle database management system and its components, the system 100 may also use other types of database management systems and their components.

The Oracle database management system can continually synchronize the Oracle control file 168 for all nodes 108 and 110 in an Oracle Real Application Cluster architecture 118, and can enable all real application cluster nodes 108 and 110 to access the Oracle control file 168 because a proper control file is necessary for an Oracle database management system to function. Since the backup/restore application 128 backs up the Oracle control file(s) 152 and/or 162 or 168 along with any backup of the corresponding Oracle database 148 and/or 158, there is no way for the backup copy dependency data in the Oracle control file(s) 152 and/or 162 or 168 to be lost. For example, the discovery module 132 accesses the first cluster node 108 while the second cluster node 110 is unavailable, and uses the Oracle Plug-in or Add-on 138 to identify the Oracle control file 168's information about the full backup copy 170 of the second cluster node 110's Oracle database 158 created from 7:30 P.M. to 11:30 P.M. on April 15$^{th}$, the archive log backup copy 176 for the second cluster node 110's Oracle database 158 created from 8:15 P.M. to 8:30 P.M. on April 15$^{th}$, and the archive log backup copy 176 for the second cluster node 110's Oracle database 158 created from 10:15 P.M. to 10:30 P.M. on April 15$^{th}$. The Oracle Plug-in or Add-on 138 also identifies the Oracle control file 168's information about the incremental cumulative backup copy 172 of the first cluster node 108's Oracle database 148 created from 5:00 A.M. to 6:00 A.M. on April 17$^{th}$ and the archive log backup copy 176 of the first cluster node 108's Oracle database 148 created from 5:45 A.M. to 6:00 A.M. on April 17$^{th}$.

The Oracle Plug-in or Add-on 138 and/or 142 can use an Oracle Cloud Interface (OCI) to connect to views of the Oracle control file(s) 152 and/or 162 or 168 and implement a SQL query using dynamic performance (V$) views of an Oracle database management system to fetch the required information about the backup copies 170-176. These views may include a V$BACKUP_DATAFILE view, a V$RMAN_BACKUP_SUBJOB_DETAILS view, a V$DATABASE_INCARNATION view, and a V$BACKUP_PIECE_DETAILS view.

The V$BACKUP_DATAFILE view displays information about the Oracle control file(s) 152 and/or 162 or 168 and datafiles in backup sets from the Oracle control file(s) 152 and/or 162 or 168, including a checkpoint change number 178 and an absolute fuzzy change number 180, as depicted in FIG. 1. The checkpoint change number 178 for a backup copy of a database identifies all changes up to the checkpoint change number which are included in the backup copy. The absolute fuzzy change number 180 for a backup copy of a database identifies the backup copy's highest system change number that corresponds to an uncommitted transaction. If the backup copy has no uncommitted transactions, then the value of the absolute fuzzy change number 180 is null. If the backup copy has uncommitted transactions, then the value of the absolute fuzzy change number 180 is the highest system change number of an archive log that contains an uncommitted transaction.

For example, if the system creates a full backup copy of a database when the system change numbers for committed transactions range from the value of 1578 to 1594 and the system change numbers for uncommitted transactions range from the value of 1595 to 1599, then the values of the checkpoint change number 178 are 1578 to 1594 with a minimum of 1578 and a maximum of 1594, and the value of the absolute fuzzy change number 180 are 1595 to 1599, with a minimum of 1595 and a maximum of 1599. In another example, if the system creates a full backup copy of a database when the system change numbers for committed transactions range from the value of 1578 to 1594 and there are no uncommitted transactions, then the values of the checkpoint change number 178 are 1578 to 1594 with a minimum of 1578 and a maximum of 1594, and the value of the absolute fuzzy change number 180 is null. The checkpoint change number 178 for a backup copy may be referred to as a system committed change number 178, which can be a logical time stamp that is associated with a completed transaction. The fuzzy change number 180 for a backup copy may be referred to as a system change number 180, which can be a logical time stamp.

The V$RMAN_BACKUP_SUBJOB_DETAILS view provides information about a recovery manager job, including an end time 182 for a backup copy. The end time 182 for a backup copy identifies the time of the last BACKUP command in the recovery manager job which created the backup copy. An end time 182 can be a most recent chronological record associated with a backup copy.

The V$DATABASE_INCARNATION view provides information about database incarnations. A database incarnation number 184, or simply an incarnation number 184, for a backup copy specifies the record identifier for the branch record in the Oracle control file(s) 152 and/or 162 or 168. An Oracle database management system creates a new incarnation of a database whenever the database is opened with the reset logs option. An incarnation number 184 may be referred to as a database version identifier 184, which can be a sequence of characters used to refer to a particular release of a structured set of information held in and accessible by a computer.

The V$BACKUP_PIECE_DETAILS view provides information about available backup pieces or copies, including a session key 186 and a copy number 188. The session key 186 for a backup copy, which may be referred to as a session identifier 186, indicates an identifier of the session during which the backup copy was created. The copy number 188 for a backup copy indicates the copy number for backup pieces created with duplex enabled, which may include up to 4 copy numbers that correspond to 4 simultaneously created duplicate backup copies. The copy number's value is 1 if a backup piece is not created with duplex enabled. A session key 186 can be an identifier of a backup job which is associated with a specific time period. A copy number 188 can be a count of simultaneously created duplicates of data in a data object.

First, the system 100 extracts backup metadata, which includes the system committed change numbers 180, the system change numbers 182, the types of the backup copies 170-176, the database version identifiers, and the details, which include the end time 184, the session key 188, and the copy number 190, for the backup copies 170-176. Then the system 100 uses the identified attributes of the checkpoint change number 180, the absolute fuzzy change number 182, the end time 184, the incarnation number 186, the session key 188, and the copy number 190 for each of the backup copies 170-176 to determine a natural identifier 192, a start system change number 194, and an end system change number 196 for each of the backup copies 170-176. Backup metadata can be information about records of at least some of the information needed to restore a data object to states at specific times when the records were created. A detail can be an individual feature associated with a backup copy.

The system 100 determines the natural identifier 190 for each of the backup copies 170-176 by combining the attribute session key 186 from the V$BACKUP_PIECE_DE-TAILS view, the attribute end time 182 from the V$RMAN_BACKUP_SUBJOB_DETAILS view, and the attribute copy number 188 from the V$BACKUP_PIECE_DETAILS view. A natural identifier 190, which may be referred to as an identifier 190 of a backup copy, can be a sequence of characters associated with a backup copy.

The system 100 combines the session key 186, the end time 182, and the copy number 188 in the natural identifier 190 to uniquely identify each of the backup copies 170-176. For example, if the Oracle recovery manager simultaneously creates 3 duplicate backup copies with duplex enabled, and the backup/restore application 128 stores these 3 duplicate backup copies on the storage array 114's three disks 120-124, any backup copy dependency data that identifies any 1 of the 3 duplicate backup copies as a dependent backup copy would need to also be applied to the 2 remaining duplicate backup copies. Consequently, the system 100 incorporates the copy number 188 in the natural identifiers 190 to track and differentiate between any simultaneously created duplicate backup copies. While the system 100 incorporates the copy number 188 in the natural identifiers 190 to differentiate between backup copies that were created during the same session at the same time, the system 100 also incorporates the end times 184 and the session keys 186 into the natural identifier identifiers 190 to differentiate between backup copies that were created during different sessions and/or at different times.

The system 100 creates a natural identifier 190 for a base copy, or a base copy natural identifier, which identifies any full backup copy which another backup copy may depend upon. Since incremental differential backup copies may depend on a previous incremental backup copy, during copy discovery the system 100 creates a natural identifier 190 for a previous copy, or a previous copy natural identifier, which identifies any previous incremental backup copy upon which another incremental differential backup copy depends.

The system 100 calculates the end system change number 192 for a backup copy as the maximum of absolute fuzzy change number 180 from the V$BACKUP_DATAFILE view for the backup copy, if the absolute fuzzy change number is not null. If the absolute fuzzy change number 180 is null, then the system 100 calculates the end system change number 192 for a backup copy as being equal to the maximum checkpoint change number 178 from the V$BACKUP_DATAFILE view for the backup copy. For example, since the system change numbers range from the value of 1578 to the value of 1594 for the full backup copy 170 of the second cluster node 110's Oracle database 158 created from 7:30 P.M. to 11:30 P.M. on April 15$^{th}$, and the second cluster node 110 created a checkpoint after committing the transactions that corresponds to the system change numbers with the values of 1578-1594, the end system change number 192's value is 1594 for the full backup copy 170. An end system change number 192 can be the largest logical time stamp which is associated with a backup copy.

The system 100 calculates the start system change number 194 for a backup copy as the minimum of the checkpoint change number 178 from the V$BACKUP_DATAFILE view for the backup copy. For example, since the system change numbers range from the value of 1578 to the value of 1594 for the full backup copy 170 of the second cluster node 110's Oracle database 158 created from 7:30 P.M. to 11:30 P.M. on April 15$^{th}$, and the second cluster node 110 created a checkpoint after committing the transactions that corresponds to the system change numbers with the values of 1578-1594, the start system change number 194's value is 1578 for the full backup copy 170. A start system change number 194 can be the smallest logical time stamp which is associated with a backup copy.

First, the system 100 identifies the attributes of the system committed change numbers 178, the system change numbers 180, the end times 182, the database version identifiers 184, the session keys 186 and the copy numbers 188 of the backup copies 170-176. Next, the system 100 determines the start system change numbers 194 as the minimums of the system committed change numbers 178, the end system change numbers 192 as the maximums of the system change numbers 180, and the natural identifiers 190 of the backup copies 170-176. Then the system 100 stores the identified attributes and the determined attributes for the archive log backup copies 176 in associated containers which may be referred to as the backup copy dependency data maps 134, hash maps, or data structures. A minimum can be the lowest or smallest amount of a varying quantity. A maximum can be the highest or largest amount of a varying quantity. A data structure can be an organization, management, and storage format of information that enables efficient access and modification.

For example, the Oracle Plug-in or Add-on 138 extracts the database version identifiers 184 for the backup copies 170-176, generates the backup copies 170-176's natural identifiers 190 based on the end time 182, the session key 186, and the copy number 188, calculates the start system change numbers 194 as the minimums of the system committed change numbers 178 for the backup copies 170-176, and calculates the end system change numbers 192 as the maximums of the system change numbers 180 for the backup copies 170-176. The Oracle Plug-in or Add-on 138 creates the backup copy dependency data map 134, which may be referred to as the log_map 134, for finding the natural identifier 190 of any archive log backup copy 176 that any of the backup copies 170-174 depend on. The log_map 134 uses the database version identifiers 196, found as the incarnation numbers 184 in the V$DATABASE_INCARNATION view, for the archive log backup copies 176 as the log_map 134's keys, and uses other backup copy dependency data maps 134, which may be referred to as the log_scn_maps 134, as the values of the log_map 134. The log_scn_maps 134 use the end system change numbers 192 for the archive log backup copies 176 as their keys and use the start system change numbers 194 for the archive log backup copies 176 and the archive log backup copies 176's' natural identifiers 190 as their values.

Having stored specific information about archive log backup copies 176 into backup copy dependency data maps 134, the system 100 identifies dependent system change numbers 197, which are the system change numbers for the archive logs that a backup copy depends on, which are calculated as the system change numbers from the backup copy's start system change number 194 to the backup copy's end system change number 192. For example, the Oracle Plug-in or Add-on 138 identifies that the full backup copy 170 depends on the archive logs corresponding to the system change numbers with the values 1578 to 1594, based on the start system change number 194's value of 1578 to the end system change number 192's value of 1594 for the full backup copy 170. In another example, the Oracle Plug-in or Add-on 138 identifies that the incremental cumulative backup copy 172 depends on the archive logs corresponding to the system change numbers with the values 1620 to 1624, based on the start system change number 194's value of 1620 to the end system change number 192's value of 1624 for the incremental cumulative backup copy 172. A dependent system change number 197 can be a logical time stamp associated with a full backup copy 170, an incremental cumulative backup copy 172, or an incremental differential backup copy 174.

After identifying the system change numbers for the archive logs that a backup copy depends on, the system 100 accesses the backup copy dependency data maps 134 to identify backed-up system change numbers 198, which identify the archive logs that are in archive log backup copies 176 and that a backup copy depends on. The backed-up system change numbers 198 are based on the archive log backup copies 176's start system change numbers 194 to the archive log backup copies 176's end system change numbers 192, which are included in the backup copies's dependent system change numbers 197. The system 100 uses the incarnation number 196 of the backup copy under investigation as the key to reference the log_map 134 that uses the incarnation numbers 196 of the archive log backup copies 176 as the key, which identifies a log_scn_map 134 as the corresponding value in the log_map 134. Then the system 100 compares the dependent system change numbers 197 of the backup copy under investigation to the backed-up system change numbers 198 of the archive log backup copies 176 in the log_scn_map 134. A backed-up system change number 198 can be a logical time stamp associated with an archive log backup copy 176.

For example, the Oracle Plug-in or Add-on 138 uses the shared database version identifier 196 for the full backup copy 170 and the April 15$^{th}$ archive log backup copies 176 to access the log_map 134 and identify the start system change number 194's value of 1578 to the end system change number 192's value of 1582 for April 15$^{th}$'s first archive log backup copy 176, which are included in the full backup copy 170's dependent system change numbers 197's values of 1578-1594. The Oracle Plug-in or Add-on 138 also identifies the start system change number 194's value of 1586 to the end system change number 192's value of 1590 for April 15$^{th}$'s second archive log backup copy 176, which are included in the full backup copy 170's dependent system change numbers 197's values of 1578-1594. Collectively, the Oracle Plug-in or Add-on 138 identifies the backed-up system change numbers 198's values of 1578-1582 and 1586-1590 which are included in the full backup copy 170's dependent system change numbers 197's values of 1578-1594.

In another example, the Oracle Plug-in or Add-on 138 uses the shared database version identifier 196 for the incremental cumulative backup copy 172 and the April 17$^{th}$ archive log backup copy 176 to access the log_map 134 and identify the backed-up system change numbers 198's values of 1620-1624. The Oracle Plug-in or Add-on 138 identifies the backed-up system change numbers 198's values of 1620-1624 based on the start system change number 194's value of 1620 to the end system change number 192's value of 1624 for April 17$^{th}$'s archive log backup copy 176, which are included in the incremental cumulative backup copy 172's dependent system change numbers 197's values of 1620-1624.

Following the identification of the dependent system change numbers 197 and the backed-up system changes numbers 197, the system 100 determines whether all the archive logs that a backup copy depends on have been backed up by determining whether the backed-up system change numbers 198 include all of the dependent system change numbers 197. For example, the Oracle Plug-in or Add-on 138 compares the backed-up system change numbers 198's values of 1578-1582 and 1586-1590 against the full backup copy 170's dependent system change numbers 197's values of 1578-1594. In another example, the Oracle Plug-in or Add-on 138 compares the backed-up system change numbers 198's values of 1620-1624 against the incremental cumulative backup copy 172's dependent system change numbers 197's values of 1620-1624.

The system 100 can offload the identification of dependencies between the backup copies 170-176 to the application hosts 108 and or 110, which can subsequently provide the backup server 112 with the identification of dependencies between the backup copies 170-176 and the natural identifiers of the backup copies 170-174 that depend on the archive log backup copies 176 and the natural identifiers of these archive log backup copies 176. Offloading the identification of dependencies between the backup copies 170-176 to the application hosts 108 and or 110 can significantly decrease the metadata for backup copies which the application hosts 108 and or 110 send to the backup server 112 and reallocate significant amounts of the storage space on the backup server 112 that would have been used for storing this metadata. Furthermore, the application hosts 108 and or 110 identifying dependent backup copies from this metadata can relieve the backup server 112 from an intensive workflow for central processing units, which can significantly improve the overall efficiency of the backup server 112. Then the backup server 112 can store the natural identifies of these backup copies 170-174 and these archive log backup copies 176 as metadata for the backup copies 170-174 which depend on the archive log backup copies 176. While replicating or moving a backup copy, the backup server 112 can use the natural identifier of the backup copy to identify any archive log backup copies 176 that the backup copy depends on, and ensure that the recovery storage for replication and/or moving the backup copy also receives all the archive log backup copies 176 required to restore the corresponding database along with the backup copy.

If the backed-up system change numbers 198 include all of the dependent system change numbers 197, then the backup copy depends on archive logs that have been backed up, and the system 100 reports the statuses of the backup copy as recoverable and immutable, possibly to a system user, and processes the backup copy according to its statuses. For example, since the backed-up system change numbers 198's values of 1620-1624 include all of the incremental cumulative backup copy 172's dependent system change numbers 197's values of 1620-1624, the Oracle Plug-in or Add-on 138 reports the statuses of the incremental cumulative backup copy 172 as recoverable and immutable and reports the natural identifier 190 of the April 17$^{th}$'s archive log backup copy 176. Although this example describes the statuses of recoverable and immutable for a backup copy that depends on archive logs that have all been backed up in archive log backup copies 176, the system 100 can report similar statuses for such a backup copy, such as tier-able and read-only. If a status of a backup copy is recoverable, the system 100 stores the backup copy with each archive log backup copy which corresponds to the backed-up system change numbers 198, in recovery storage. For example, the recoverable status and the reported natural identifier 190 of the April 17$^{th}$ archive log backup copy 176 enables the backup/restore application 128 to replicate and/or move the incremental cumulative backup copy 172 with the April 17$^{th}$ archive log backup copy 176 which corresponds to the backed-up system change numbers 198's values of 1620-1624. Replicating can be the duplicating of a backup copy. Moving can be the relocating of a backup copy from one computer storage to another computer storage.

If a status of a backup copy is immutable, the system 100 can protect the backup copy from being modified by any updates received for the backup copy. For example, the immutable status enables the backup/restore application 128 to protect the incremental cumulative backup copy 172 from being modified by any updates received for the incremental cumulative backup copy 172. Recovery storage can be space available for retaining a backup copy used for restoring a database. An update can be the latest information for or about a backup copy.

If the backed-up system change numbers 198 do not include all of the dependent system change numbers 197, then the backup copy depends on archive logs that have not been backed up, and the system 100 reports the statuses of the backup copy as unrecoverable and mutable, possibly to a system user, and processes the backup copy according to its statuses. For example, since the backed-up system change numbers 198's values of 1578-1582 and 1586-1590 do not include all of the full backup copy 170's dependent system change numbers 197's values of 1578-1594, the Oracle Plug-in or Add-on 138 reports the statuses of the full backup copy 170 as unrecoverable and mutable. Although this example describes the statuses of unrecoverable and mutable for a backup copy that depends on archive logs that have not all been backed up in archive log backup copies 176, the system 100 can report similar statuses for such a backup copy, such as not recoverable, not tier-able, and read-write.

If a status of a backup copy is unrecoverable, the system 100 prevents the backup copy from being stored to recovery storage. For example, the unrecoverable status prevents the backup/restore application 128 from replicating and/or moving the full backup copy 170. If the backup/restore application 128 replicated only the full backup copy 170 of the Oracle database 148 or moved only the full backup copy 170 of the Oracle database 148 to the cloud tier 116, the full backup copy 170 of the Oracle database 148 would be useless for restoring the Oracle database 148 without the full backup copy 170's corresponding archive logs that are missing from the archive log backup copies 176. If a status of a backup copy is mutable, the system 100 enables the backup copy to be modified by any updates received for the backup copy, and/or suggests a corrective action to a system user. For example, the mutable status prevents the backup/restore application 128 from protecting the incremental cumulative backup copy 172 from being modified by any updates received for the incremental cumulative backup copy 172. The backup/restore application 128 can also output a suggestion for a system administrator to execute a full backup copy A corrective action can be the process of counteracting an undesirable thing. A system user can be an operator of a computer.

If a status of a backup copy is mutable, the system 100 can report that a backup copy depends on archive logs that have not been backed up and output identifiers of the backup copy's system change numbers that are missing from the archive log backup copies 176. For example, since the backed-up system change numbers 198 with the values of 1578-1582 and 1586-1590 do not include all of the full backup copy 170's dependent system change numbers 197 with the values of 1578-1594, the Oracle Plug-in or Add-on 138 reports that the full backup copy 170 is missing the backup copies of the archive logs corresponding to the system change numbers 1583-1585 and 1591-1594. The system 100 can protect the archive logs corresponding to the missing system change numbers 199 from being deleted until the creation and/or deletion of a backup copy that includes the corresponding archive logs. For example, the Oracle Plug-in or Add-on 138 reports that the full backup copy 170 is missing the backup copies of the archive logs corresponding to the system change numbers 1583-1585 and 1591-1594. The report of archive logs that are missing from the archive log backup copies 176 can instruct the application host 108 to prevent system users from deleting the archive logs corresponding to the system change numbers 1583-1585 and 1591-1594, until the backup/restore application 128 creates or subsequently deletes an archive log backup copy 176 that includes the archive logs that are missing from the archive log backup copies 176. If the system 100 protects the identified archive logs until an archive log backup copy 176 includes the identified archive logs, then these archive logs may be restored from such an archive log backup copy 176, even though the archive logs were supposed to be deleted. If the system 100 protects the identified archive logs until an archive log backup copy 176 that includes the identified archive logs subsequently expires, then these archive logs may be restored from such an archive log backup copy 176 until the archive log backup copy 176 is are deleted, A missing system change number can be a logical time stamp that is in a full backup copy, an incremental cumulative backup copy, or an incremental differential backup copy, but is not in any archive log backup copy. An archive log can be a record of a database transaction. Creation can be the action of bringing aa backup copy into existence. Deletion can be the removal of a backup copy from a computer's storage.

If the Oracle Plug-in or Add-on 138 and/or 142 informs the backup server 112 that a status of backup copy is mutable, or the backup server 112 determines that a status of a backup copy is mutable, the backup server 112 may be able to trigger the creation of an appropriate archive log backup copy 176 which can subsequently result in changing the status of the mutable backup/copy to immutable and thereby also recoverable. The application host agent-services or agents 136 and/or 140 can store a list of all the discovered backup copies 170-176 in a local SQL lite database, enumerate all of the backup copies 170-174 which have the status of mutable or unrecoverable, and use a command such as "GetMutableUpdates" to request the Oracle Plug-in or Add-on 138 and/or 142 to provide updates for the mutable backup copies 170-174. Allocating the task of identifying the archive log backup copies 176 that include the missing system change numbers 199 to the application hosts 108 and/or 110 can significantly reduce the amount of communications between the backup server and the application hosts 108 and/or 110. Alternatively, the backup server 112 can store a list of all the discovered backup copies 170-176, enumerate all the backup copies 170-174 which have the status of mutable or unrecoverable, and send the list of the mutable backup copies 170-174 with the missing system change numbers 199 to the application host agent-services or agents 136 and/or 140 to request updates for the mutable backup copies 170-174, Then the application host agent-services or agents 136 and/or 140 can use a command such as "GetMutableUpdates" to request the Oracle Plug-in or Add-on 138 and/or 142 to provide updates for the mutable backup copies 170-174.

Application host agent-services or agents 136 and/or 140 can store backup copy metadata, such as the missing system change numbers 199, in a data object, such as an opaque blob, As part of the GetMutableUpdates requests, the application host agent-services or agents 136 and/or 140 can send the data object to the Oracle Plug-in or Add-on 138 and/or 142. The application host agent-services or agents 136 and/or 140 may send an opaque blob to the Oraclw Plug-in or Add-on 138 and/or 142, but the application host agent-services or agents 136 and/or 140 does not send the opaque blob to the backup server 112. The application host agent-services or agents 136 and/or 140 cannot read the backup copy metadata from the opaque blob, which collects backup copy metadata from each POracle lug-in or Add-on 138 and/or 142, such that different types of Plug-ins and/or Add-ons that service different types of databases and applications can read and store backup copy metadata on the shared opaque blob.

After the missing system change numbers 199 are identified, the system 100 requests the discovery of an application host's resources to retrieves information about backup copies 170-176 and identify the missing system change numbers 199. For example, the application host agent-services 136 and 140 use a "GetMutableUpdates" command to request the Oracle Plug-in or Add-on 138 and/or 142 to provide updates for the mutable backup copies 170-174 by discovering their client application resources These application resources include the Oracle control files 152 and 162 if the clients 108 and 110 are independent application hosts 108 and 110, or include the Oracle control file 168 if the clients 108 and 110 are the first cluster node 108 and the second cluster node 110 in an Oracle Real Application Cluster connected by the cluster architecture 118.

After retrieving information about the backup copies 170-176 to identify the missing system change numbers 199, the system 100 extracts backup metadata to identify the missing system change numbers 199. The backup metadata includes the system committed change numbers 178, the system change numbers 180, the types of backup copies 170-176, the database version identifiers 184, and the details 186 and 188, for the backup copies 170-176. For example, the Oracle Plug-in or Add-on 138 extracts backup metadata from the Oracle control file 168 about the lag-scheduled archive log backup copy 176 of the second cluster node 110's Oracle database 158 created from 1:00 A.M. to 1:15 A.M. on April $16^{th}$, and the error-delayed archive log backup copy 176 of the second cluster node 110's Oracle database 158 created from 1:20 A.M. to 1:35 A.M. on April $16^{th}$.

Following the extraction of the backup copies 170-176' metadata, the system 100 uses the newly created archive log backup copies 176 to regenerate the data structure 134 for identifying archive log dependencies and backup copy recoverability. The data structure 134 includes the start system change numbers 194, based on the minimums of the system committed change numbers 178, the end system change numbers 192, based on the maximums of the system change numbers 180, the database version identifiers 196, and the identifiers 190 for the updated set of archive log backup copies 176. For example, the Oracle Plug-in or Add-on 138 extracts the database version identifiers 184 for the backup copies 170-176, generates the backup copies 170-176's natural identifiers 190, calculates the start system change numbers 194 as the minimums of the system committed change numbers 178 for the backup copies 170-176, and calculates the end system change numbers 192 as the maximums of the system change numbers 180 for the backup copies 170-176.

The Oracle Plug-in or Add-on 138 recreates the log_map 134 for finding the natural identifier 190 of any archive log backup copy 176 that any of the backup copies 170-174 depend on. The log_map 134 uses the database version identifiers 196, found as the incarnation numbers 184 in the V$DATABASE_INCARNATION view, for the updated set of archive log backup copies 176 as the log_map 134's keys, and uses the log_scn_maps 134, as the values of the log_map 134. The log_scn_maps 134 use the end system change numbers 192 for the updated set of archive log backup copies 176 as their keys and use the start system change numbers 194 for the updated set of archive log backup copies 176 and the updated set of archive log backup copies 176's' natural identifiers 190 as their values.

Having regenerated the data structure 134, the system 100 identifies an updated set of backed-up system change numbers 198 in the data structure 134 which are included in the missing system change numbers 199. The updated set of backed-up system change numbers 198 are based on the start system change numbers 194 to the end system change numbers 192 for the updated set of archive log backup copies 176. For example, the Oracle Plug-in or Add-on 138 reads the missing system change numbers 199 from the opaque blob, and uses the shared database version identifier 196 for the full backup copy 170 and the April $16^{th}$ archive log backup copies 176 to access the log_map 134. The Oracle Plug-in or Add-on 138 identifies the start system change number 194's value of 1591 to the end system change number 192's value of 1594 for April $16^{th}$'s lag-scheduled archive log backup copy 176, which are included in the missing system change numbers 199's values of 1583-1585 and 1591-1594 for the full backup copy 170. The Oracle Plug-in or Add-on 138 also identifies the start system change number 194's value of 1583 to the end system change number 192's value of 1585 for April $16^{th}$'s error-delayed archive log backup copy 176, which are included in missing system change numbers 199's values of 1583-1585 and 1591-1594 for the full backup copy 170. Collectively, the Oracle Plug-in or Add-on 138 identifies the updated set of backed-up system change numbers 198's values of 1583-1585 and 1591-1594 which are included in the missing system change numbers 199's values of 1583-1585 and 1591-1594 for the full backup copy 170.

Following the identification of the missing system change numbers 199 and the updated set of backed-up system changes numbers 198, the system 100 determines whether the updated set of backed-up system change numbers 198 include all of the missing system change numbers 199. For example, the Oracle Plug-in or Add-on 138 compares the updated set of backed-up system change numbers 198's values of 1583-1585 and 1591-1594 against the missing system change numbers 199's values of 1583-1585 and 1591-1594 for the full backup copy 170.

Whether the GetMutableUpdates request is initiated by the backup server 112 or by the agent-services or agents 136 and/or 140, the Oracle Plug-in or Add-on 138 and/or 142 sends the backup copy dependency information to the backup server 112. If the updated set of backed-up system change numbers 198 include all of the missing system change numbers 199, then the backup copy depends on archive logs that have been backed up by the archive log backup copies 176. Therefore, the system 100 reports the statuses of the backup copy as immutable and recoverable, updates the backup server 112 with the identifiers of each corresponding archive log backup copy 176, and stores the backup copy in recovery storage with each archive log backup copy 176 which corresponds to any set of backed-up system change numbers 198. For example, the Oracle Plug-in or Add-on 138 reports the statuses of immutable and recoverable for the full backup copy 170 and the natural identifiers 190 of the two April 16$^{th}$ archive log backup copies 176, because the combined backed-up system change numbers 198's values of 1578-1594 include all of the full backup copy 170's dependent system change numbers 197's values of 1578-1594, The recoverable status and the natural identifiers 190 of the April 15$^{th}$ and 16$^{th}$ archive log backup copies 176 enables the backup/restore application 128 to replicate and/or move the full backup copy 172 with the April 15$^{th}$ and 16$^{th}$ archive log backup copies 176 which corresponds to the backed-up system change numbers 198's values of 1578-1594. The immutable status enables the backup/restore application 128 to protect the full backup copy 170 from being modified by any updates received for the full backup copy 170.

If the updated set of backed-up system change numbers 198 do not include all of the missing system change numbers 199, a backup copy that depends on archive logs that have not been backed up in an archive log backup copy 176 is still missing backup copies of archive logs. Therefore, the system 100 outputs identifiers of the missing system change numbers 199 that are missing from the updated set of backed-up system change numbers 198 as still missing system change numbers 199, updates the backup server 112 with the identifiers of any new archive log backup copies 176 that contain some of the missing archive logs, and maintains the status of the backup copy as mutable. For example, the Oracle Plug-in or Add-on 138 reports that the natural identifier 190 of the archive log backup copy 176 that includes the system change numbers 1586-1594, and reports that the full backup copy 170 is still missing the backup copy of the archive logs corresponding to the system change numbers 1583-1585, because at 1:17 A.M. on April 16$^{th}$ the combined backed-up system change numbers 198's values of 1578-1582 and 1586-1594 do not yet include all of the full backup copy 170's dependent system change numbers 197's values of 1578-1594. If the Oracle Plug-in or Add-on 138 and/or 142 discovers only part of the missing system change numbers 199, the Oracle Plug-in or Add-on 138 and/or 142 may store this partial information on the opaque blob and return the opaque blob to the application host agent-services or agents 136 and/or 140.

Then the system 100 continues looking for the missing system change numbers 199 that are still missing. Any time after 1:35 A.M. on April 16$^{th}$ when the system 100 subsequently discovers the error-delayed archive log backup copy 176 of the second cluster node 110's Oracle database 158 created from 1:20 A.M. to 1:35 A.M. on April 16$^{th}$, then the system 100 will report the statuses of the full backup copy 170 as recoverable and immutable, and process the full backup copy 170 according to the statuses. The Oracle Plug-in or Add-on 138 and/or 142 participates in the GetMutableUpdates requests until the archive log backup copies 176 that include all the missing system change numbers 199 are identified, or a timeout has been reached.

If the Oracle Plug-in or Add-on 138 and/or 142 did not identify any missing system change numbers 199 for a backup copy, then the Oracle Plug-in or Add-on 138 and/or 142 will not report on the backup copy. As a system optimization, the application host agent-services or agents 136 and/or 140 reports the mutable status for a backup copy only once to the backup server 112, and will only report the status of the backup copy again when the status of the backup copy is changed to immutable. The application host agent-services or agents 136 and/or 140 typically reports on only one occasion that a status of a backup copy is immutable.

Although the following paragraphs describe Dell Corporation's PowerProtect® backup/restore application, DellCorporation's NetWorker® backup/restore application, and Dell Corporation's Avamar® backup/restore application as examples of the backup/restore application 128, the backup/restore application 128 may be any other type of backup/restore application which provides the backup/restore functionalities described in the Background section. The backup server 112 may be any other type of backup server which provides the backup/restore functionalities described in the Background section.

The backup/restore application 128 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances. When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 128 may be an Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 128 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types. The storage array 114 may be a Dell Corporation's Powermax, a Dell Corporation XIO, or a Dell Corporation Unity storage array.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk 120 for 6 months, store a primary clone of the backup copies onto the second disk 122 for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and move each full backup copy created at the end of the month to cloud tiering 116 for long term retention. Backup copies stored in the cloud tiering 116 have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can specifies the target storage device where backup copies are stored, such as the first disk 120, the second disk 122, the third disk 124, and/or cloud-tiering 116.

FIG. 2 is a flowchart that illustrates a method for dynamically updating database archive log dependencies and backup copy recoverability, under an embodiment. Flowchart 200 illustrates method acts illustrated as flowchart blocks for certain steps involved in the backup server 112, the clients 102-110, and/or between the clients 102-110 and the backup server 112 of FIG. 1.

Information about backup copies is optionally retrieved, block 202. A backup server can request the discovery of an application host's resources. For example, and without limitation, this can include the discovery module 132 making REST application programming interface calls requests for the application host agent-services 136 and 140 to discover their client application resources, which include the Oracle control files 152 and 162 if the clients 108 and 110 are independent application hosts 108 and 110, or include the Oracle control file 168 if the clients 108 and 110 are the first cluster node 108 and the second cluster node 110 in an Oracle Real Application Cluster connected by the cluster architecture 118.

After retrieving information about backup copies, backup metadata, comprising system committed change numbers, system change numbers, types, database version identifiers, and details, for backup copies is extracted, block 204. The system extracts backup copies' metadata from a parameter file. By way of example and without limitation, this can include the discovery module 132 requesting the application host agent-services 136 to access the first cluster node 108 while the second cluster node 110 is unavailable, and the Oracle Plug-in or Add-on 138 extracting backup metadata from the Oracle control file 168 about the full backup copy 170 of the second cluster node 110's Oracle database 158 created from 7:30 P.M. to 11:30 P.M. on April 15$^{th}$, the archive log backup copy 176 of the second cluster node 110's Oracle database 158 created from 8:15 P.M. to 8:30 P.M. on April 15$^{th}$, and the archive log backup copy 176 of the second cluster node 110's Oracle database 158 created from 10:15 P.M. to 10:30 P.M. on April 15$^{th}$. The Oracle Plug-in or Add-on 138 also extracts backup metadata from the Oracle control file 168 about the incremental cumulative backup copy 172 of the first cluster node 108's Oracle database 148 created from 5:00 A.M. to 6:00 A.M. on April 17$^{th}$ and the archive log backup copy 176 of the first cluster node 108's Oracle database 148 created from 5:45 A.M. to 6:00 A.M. on April 17$^{th}$.

Following the extraction of specific backup copies' metadata, a data structure, comprising start system change numbers, based on the minimums of the system committed change numbers, end system change numbers, based on the maximums of the system change numbers, the database version identifiers, and identifiers including the details, is generated for a set of archive log backup copies, block 206. The system processes and stores specific information about archive log backup copies into maps for identifying archive log dependencies and backup copy recoverability. In embodiments, this can include the Oracle Plug-in or Add-on 138 extracting he database version identifiers 184 for the backup copies 170-176, generating the backup copies 170-176's natural identifiers 190, calculating the start system change numbers 194 as the minimums of the system committed change numbers 178 for the backup copies 170-176, and calculating the end system change numbers 192 as the maximums of the system change numbers 180 for the backup copies 170-176. The Oracle Plug-in or Add-on 138 creates the log_map 134, which uses the database version identifiers 196 for the set of archive log backup copies 176 as the log_map 134's keys, and uses the log_scn_maps 134, as the values of the log_map 134. The log_scn_maps 134 use the end system change numbers 192 for the set of archive log backup copies 176 as their keys and use the start system change numbers 194 for the set of archive log backup copies 176 and the set of archive log backup copies 176's' natural identifiers 190 as their values.

A set can be a collection of similar or related things. The Oracle copy metadata 150 and 160 record information about a set of archive log backup copies 176 at a first point in time and an updated set of archive log backup copies 176 at a second point in time. If the application host agent-services or agents 136 and/or 140 respond to a discovery request by reporting the discovery of application resources which the application host agent-services or agents 136 and/or 140 already reported as discovered, then the updated set of archive log backup copies 176 include all of the set of archive log backup copies 176 that were not deleted between the first and second points in time. If the application host agent-services or agents 136 and/or 140 respond to a discovery request by reporting the discovery of the application resources which had not been previously reported as discovered, then the set of archive log backup copies 176 are all of the archive log backup copies recorded in the Oracle copy metadata 150 and 160 at the first point in time, and the updated set of archive log backup copies 176 are the new archive log backup copies that were recorded after the set of archive log backup copies 176 were recorded at the first point in time. Similarly, the updated set of backed-up system change numbers 198 may or may not include the initial set of backed-up system change numbers 198.

Having stored specific information about archive log backup copies into a data structure, dependent system change numbers are identified, based on a start system change number to an end system change number for a backup copy corresponding to a database version identifier, block 208. The system identifies the system change numbers for the archive logs that a backup copy depends on. For example, and without limitation, this can include the Oracle Plug-in or Add-on 138 identifying that the full backup copy 170 depends on the archive logs corresponding to the system change numbers with the values 1578 to 1594, based on the start system change number 194's value of 1578 to the end system change number 192's value of 1594 for the full backup copy 170. In another example, the Oracle Plug-in or Add-on 138 identifies that the incremental cumulative backup copy 172 depends on the archive logs corresponding to the system change numbers with the values 1620 to 1624, based on the start system change number 194's value of 1620 to the end system change number 192's value of 1624 for the incremental cumulative backup copy 172.

After identifying the system change numbers for the archive logs that a backup copy depends on, a set of backed-up system change numbers are identified in the data structure, based on the start system change numbers to the end system change numbers for the set of archive log backup copies corresponding to a database version identifier, which are included in the dependent system change numbers, block 210. The system identifies the archive logs that a backup copy depends on which are also in archive log backup copies. By way of example and without limitation, this can include the Oracle Plug-in or Add-on 138 using the shared database version identifier 196 for the full backup copy 170 and the April $15^{th}$ archive log backup copies 176 to access the log_map 134 and identify the start system change number 194's value of 1578 to the end system change number 192's value of 1582 for April $15^{th}$'s first archive log backup copy 176, which are included in the full backup copy 170's dependent system change numbers 197's values of 1578-1594. The Oracle Plug-in or Add-on 138 also identifies the start system change number 194's value of 1586 to the end system change number 192's value of 1590 for April $15^{th}$'s second archive log backup copy 176, which are included in the full backup copy 170's dependent system change numbers 197's values of 1578-1594. Collectively, the Oracle Plug-in or Add-on 138 identifies the backed-up system change numbers 198's values of 1578-1582 and 1586-1590 which are included in the full backup copy 170's dependent system change numbers 197's values of 1578-1594.

In another example, the Oracle Plug-in or Add-on 138 uses the shared database version identifier 196 for the incremental cumulative backup copy 172 and the April $17^{th}$ archive log backup copy 176 to access the log_map 134 and identify the backed-up system change numbers 198's values of 1620-1624, based on the start system change number 194's value of 1620 to the end system change number 192's value of 1624 for April $17^{th}$'s archive log backup copy 176, which are included in the incremental cumulative backup copy 172's dependent system change numbers 197's values of 1620-1624.

Following the identification of the dependent system change numbers and the set of backed-up system changes numbers, whether the set of backed-up system change numbers include all of the dependent system change numbers is determined, block 212. The system determines whether all the archive logs that a backup copy depends on have been backed up in archive log backup copies. In embodiments, this can include the Oracle Plug-in or Add-on 138 comparing the backed-up system change numbers 198's values of 1578-1582 and 1586-1590 against the full backup copy 170's dependent system change numbers 197's values of 1578-1594. In another example, the Oracle Plug-in or Add-on 138 compares the backed-up system change numbers 198's values of 1620-1624 against the incremental cumulative backup copy 172's dependent system change numbers 197's values of 1620-1624. If the backed-up system change numbers include all of the dependent system change numbers, the method 200 continues to block 214 to report the statuses of the backup copy as recoverable and immutable, and process the backup copy according to the statuses. If the backed-up system change numbers do not include all of the dependent system change numbers, the method 200 proceeds to block 218 to report the statuses of the backup copy as unrecoverable and mutable, and process the backup copy according to the statuses.

If the set of backed-up system change numbers include all of the dependent system change numbers, the backup copy is optionally stored, with each archive log backup copy which corresponds to the set of backed-up system change numbers, in recovery storage, block 214. The system can report a recoverable status for a backup copy that depends on archive logs that have been backed up in archive log backup copies, and store the corresponding backup copies accordingly. For example, and without limitation, this can include the Oracle Plug-in or Add-on 138 reporting a status of recoverable for the incremental cumulative backup copy 172 and the natural identifier 190 of the April $17^{th}$ archive log backup copy 176, because the backed-up system change numbers 198's values of 1620-1624 include all of the incremental cumulative backup copy 172's dependent system change numbers 197's values of 1620-1624, The recoverable status and the natural identifier 190 of the April $17^{th}$ archive log backup copy 176 enables the backup/restore application 128 to replicate and/or move the incremental cumulative backup copy 172 with the April $17^{th}$ archive log backup copy 176 which corresponds to the backed-up system change numbers 198's values of 1620-1624.

If the set of backed-up system change numbers include all of the dependent system change numbers, the backup copy is optionally protected from being modified by any updates received for the backup copy, block 216. The system can report a status of immutable for a backup copy that depends on archive logs that have been backed up in archive log backup copies. By way of example and without limitation, this can include the Oracle Plug-in or Add-on 138 reporting a status of immutable for the incremental cumulative backup copy 172, because the backed-up system change numbers 198's values of 1620-1624 include all of the incremental cumulative backup copy 172's dependent system change numbers 197's values of 1620-1624. The immutable status enables the backup/restore application 128 to protect the incremental cumulative backup copy 172 from being modified by any updates received for the incremental cumulative backup copy 172. Then the method 200 terminates, which enables the method 200 to be applied to another backup copy.

If the set of backed-up system change numbers do not include all of the dependent system change numbers, the backup copy is optionally prevented from being stored to recovery storage, block 218. The system can report a status of unrecoverable for a backup copy that depends on archive logs that have not been backed up in an archive log backup copy. In embodiments, this can include the Oracle Plug-in or Add-on 138 reporting a status of unrecoverable for the full backup copy 170, because the backed-up system change numbers 198's values of 1578-1582 and 1586-1590 do not include all of the full backup copy 170's dependent system change numbers 197's values of 1578-1594, which prevents the backup/restore application 128 from replicating and/or moving the full backup copy 170.

If the set of backed-up system change numbers do not include all of the dependent system change numbers, the backup copy is optionally enabled to be modified by any updates received for the backup copy, and/or a corrective action is optionally suggested to a system user, block 220. The system can report a status of mutable for a backup copy that depends on archive logs that have not been backed up in an archive log backup copy. For example, and without limitation, this can include the Oracle Plug-in or Add-on 138 reporting a status of mutable for the full backup copy 170, because the backed-up system change numbers 198's values of 1578-1582 and 1586-1590 do not include all of the full backup copy 170's dependent system change numbers 197's values of 1578-1594, which prevents the backup/restore application 128 from protecting the full backup copy 170 from being modified by any updates received for the full backup copy 170.

If the set of backed-up system change numbers do not include all of the dependent system change numbers, identifiers of the dependent system change numbers that are missing from the set of backed-up system change numbers are output as missing system change numbers, block 222. The system reports that a backup copy that depends on archive logs that have not been backed up in an archive log backup copy is missing backup copies of these archive logs. By way of example and without limitation, this can include the Oracle Plug-in or Add-on 138 reporting that the full backup copy 170 is missing the backup copies of the archive logs corresponding to the system change numbers 1583-1585 and 1591-1594, because the backed-up system change numbers 198's values of 1578-1582 and 1586-1590 do not include all of the full backup copy 170's dependent system change numbers 197's values of 1578-1594.

If the set of backed-up system change numbers do not include all of the dependent system change numbers, archive logs corresponding to the missing system change numbers are optionally protected from being deleted until the creation or deletion of an archive log backup copy that includes the corresponding archive logs, block 224. The system can report that a backup copy that depends on archive logs that have not been backed up in an archive log backup copy is missing backup copies of archive logs that require protection from deletion. In embodiments, this can include the Oracle Plug-in or Add-on 138 reporting that the full backup copy 170 is missing the backup copies of the archive logs corresponding to the system change numbers 1583-1585 and 1591-1594. The report of archive logs that are missing from the archive log backup copies 176 can instruct the application host 108 to prevent system users from deleting the archive logs corresponding to the system change numbers 1583-1585 and 1591-1594, until the backup/restore application 128 creates or subsequently deletes an archive log backup copy 176 that includes the missing archive logs.

After the missing system change numbers are identified, information about the backup copies is optionally retrieved, block 226. A system can request the discovery of an application host's resources to identify the missing system change numbers. For example, and without limitation, this can include the application host agent-services 136 and 140 using a "GetMutableUpdates" command to request the Oracle Plug-in or Add-on 138 and/or 142 to provide updates for the mutable backup copies 170-174 by discovering their client application resources These application resources include the Oracle control files 152 and 162 if the clients 108 and 110 are independent application hosts 108 and 110, or include the Oracle control file 168 if the clients 108 and 110 are the first cluster node 108 and the second cluster node 110 in an Oracle Real Application Cluster connected by the cluster architecture 118.

After retrieving information about the backup copies to identify the missing system change numbers, backup metadata, including the system committed change numbers, the system change numbers, the types of the backup copies, the database version identifiers, and the details, which include the end time, the session key, and the copy number, for the backup copies is optionally extracted, block 228. The system can extract backup copies' metadata from a parameter file to identify the missing system change numbers. By way of example and without limitation, this can include the Oracle Plug-in or Add-on 138 extracting backup metadata from the Oracle control file 168 about the lag-scheduled archive log backup copy 176 of the second cluster node 110's Oracle database 158 created from 1:00 A.M. to 1:15 A.M. on April $16^{th}$, and the error-delayed archive log backup copy 176 of the second cluster node 110's Oracle database 158 created from 1:20 A.M. to 1:35 A.M. on April $16^{th}$.

Following the extraction of the backup copies' metadata, a data structure, comprising the start system change numbers, based on the minimums of the system committed change numbers, the end system change numbers, based on the maximums of the system change numbers, the database version identifiers, and the identifiers including the details, is regenerated for a updated set of archive log backup copies, block 230. The system processes and stores specific information about the current archive log backup copies into maps for identifying archive log dependencies and backup copy recoverability. In embodiments, this can include the Oracle Plug-in or Add-on 138 extracting the database version identifiers 184 for the backup copies 170-176, generating the backup copies 170-176's natural identifiers 190, calculating the start system change numbers 194 as the minimums of the system committed change numbers 178 for the backup copies 170-176, and calculating the end system change numbers 192 as the maximums of the system change numbers 180 for the backup copies 170-176. The Oracle Plug-in or Add-on 138 recreates the log_map 134, which uses the database version identifiers 196 for the updated set of archive log backup copies 176 as the log_map 134's keys, and uses the log_scn_maps 134, as the values of the log_map 134. The log_scn_maps 134 use the end system change numbers 192 for the updated set of archive log backup copies 176 as their keys and use the start system change numbers 194 for the updated set of archive log backup copies 176 and the updated set of archive log backup copies 176's' natural identifiers 190 as their values.

Having regenerated the data structure, an updated set of backed-up system change numbers are identified in the data structure, based on the start system change numbers to the end system change numbers for the updated set of archive log backup copies corresponding to a database version identifier, which are included in the missing system change numbers, block 232. The system identifies the archive logs that a backup copy depends on which are also in archive log backup copies. For example, and without limitation, this can include the Oracle Plug-in or Add-on 138 reading the missing system change numbers 199 from the opaque blob, and using the shared database version identifier 196 for the full backup copy 170 and the April 16$^{th}$ archive log backup copies 176 to access the log_map 134. The Oracle Plug-in or Add-on 138 identifies the start system change number 194's value of 1591 to the end system change number 192's value of 1594 for April 16$^{th}$'s lag-scheduled archive log backup copy 176, which are included in the missing system change numbers 199's values of 1583-1585 and 1591-1594 for the full backup copy 170. The Oracle Plug-in or Add-on 138 also identifies the start system change number 194's value of 1583 to the end system change number 192's value of 1585 for April 16$^{th}$'s error-delayed archive log backup copy 176, which are included in missing system change numbers 199's values of 1583-1585 and 1591-1594 for the full backup copy 170. Collectively, the Oracle Plug-in or Add-on 138 identifies the updated set of backed-up system change numbers 198's values of 1583-1585 and 1591-1594 which are included in the missing system change numbers 199's values of 1583-1585 and 1591-1594 for the full backup copy 170.

Following the identification of the missing system change numbers and the updated set of backed-up system changes numbers, whether the updated set of backed-up system change numbers include all of the missing system change numbers is determined, block 234. The system determines whether all the archive logs that a backup copy depends on have been backed up in archive log backup copies. By way of example and without limitation, this can include the Oracle Plug-in or Add-on 138 comparing the updated set of backed-up system change numbers 198's values of 1583-1585 and 1591-1594 against the missing system change numbers 199's values of 1583-1585 and 1591-1594 for the full backup copy 170. If the updated set of backed-up system change numbers include all of the missing system change numbers, the method 200 continues to block 236 to report the statuses of the backup copy as recoverable and immutable, and process the backup copy according to the statuses. If the updated set of backed-up system change numbers do not include all of the missing system change numbers, the method 200 proceeds to block 240 to maintain the statuses of the backup copy as unrecoverable and mutable, and possibly recalculate the missing system change numbers 199.

If the updated set of backed-up system change numbers include all of the missing system change numbers, the backup copy is stored, with each archive log backup copy which corresponds to any set of backed-up system change numbers, in recovery storage, block 236. The system can report a recoverable status for a backup copy that depends on archive logs that have been backed up in archive log backup copies, and store the corresponding backup copies accordingly. In embodiments, this can include the Oracle Plug-in or Add-on 138 reporting a status of recoverable for the full backup copy 170 and the natural identifiers 190 of the two April 16$^{th}$ archive log backup copies 176, because the combined backed-up system change numbers 198's values of 1578-1594 include all of the full backup copy 170's dependent system change numbers 197's values of 1578-1594, The recoverable status and the natural identifiers 190 of the April 15$^{th}$ and 16$^{th}$ archive log backup copies 176 enables the backup/restore application 128 to replicate and/or move the full backup copy 172 with the April 15$^{th}$ and 16$^{th}$ archive log backup copies 176 which corresponds to the backed-up system change numbers 198's values of 1578-1594.

If the updated set of backed-up system change numbers include all of the missing system change numbers, the backup copy is optionally protected from being modified by any updates received for the backup copy, block 238. The system can report a status of immutable for a backup copy that depends on archive logs that have been backed up in archive log backup copies. For example, and without limitation, this can include the Oracle Plug-in or Add-on 138 reporting a status of immutable for the full backup copy 170, because the updated set of backed-up system change numbers 198's values of 1583-1585 and 1591-1594 include all of the missing system change numbers 199's values of 1583-1585 and 1591-1594 for the full backup copy 170. The immutable status enables the backup/restore application 128 to protect the full backup copy 170 from being modified by any updates received for the full backup copy 170. Then the method 200 terminates, which enables the method 200 to be applied to another backup copy.

If the updated set of backed-up system change numbers do not include all of the missing system change numbers, identifiers of the missing system change numbers that are missing from the updated set of backed-up system change numbers are output as still missing system change numbers, block 240. The system reports that a backup copy that depends on archive logs that have not been backed up in an archive log backup copy is still missing backup copies of archive logs. By way of example and without limitation, this can include the Oracle Plug-in or Add-on 138 reporting that the full backup copy 170 is still missing the backup copy of the archive logs corresponding to the system change numbers 1583-1585, because at 1:17 A.M. on April 16$^{th}$ the combined backed-up system change numbers 198's values of 1578-1582 and 1586-1594 do not yet include all of the full backup copy 170's dependent system change numbers 197's values of 1578-1594. Then the method 200 returns to block 226 to continue looking for the missing system change numbers 199 that are still missing. When the error-delayed archive log backup copy 176 of the second cluster node 110's Oracle database 158 created from 1:20 A.M. to 1:35 A.M. on April 16$^{th}$ is subsequently discovered after 1:35 A.M. on April 16$^{th}$, the system 100 will return to block 236 to report the statuses of the full backup copy 170 as recoverable and immutable, and process the full backup copy 170 according to the statuses.

While the examples above describe components of the clients 108 and 110 executing the actions in the blocks 204-212 and 226-234, in some embodiments, components of the backup server 112 may execute the actions in the blocks 204-212 and 226-234. For example, after requesting the first application host agent-service or agent 136 to use the Oracle Plug-in or Add-on 138 to identify information from Oracle control file(s) about backup copies, the backup/restore application 128 receives, processes, and store specific information about backup copies into maps, use the maps' keys to determine whether the archive log backup copies' backed-up system change numbers include all of a backup copy's dependent system change numbers. After identifying any missing system change numbers and requesting the first application host agent-service or agent 136 to use the Oracle Plug-in or Add-on 138 to identify information from Oracle control file(s) about backup copies, the backup/restore application 128 receives, processes, and store specific information about backup copies into maps, use the maps' keys to determine whether the newest archive log backup copies' backed-up system change numbers include all of the missing system change numbers.

Figure 2A:
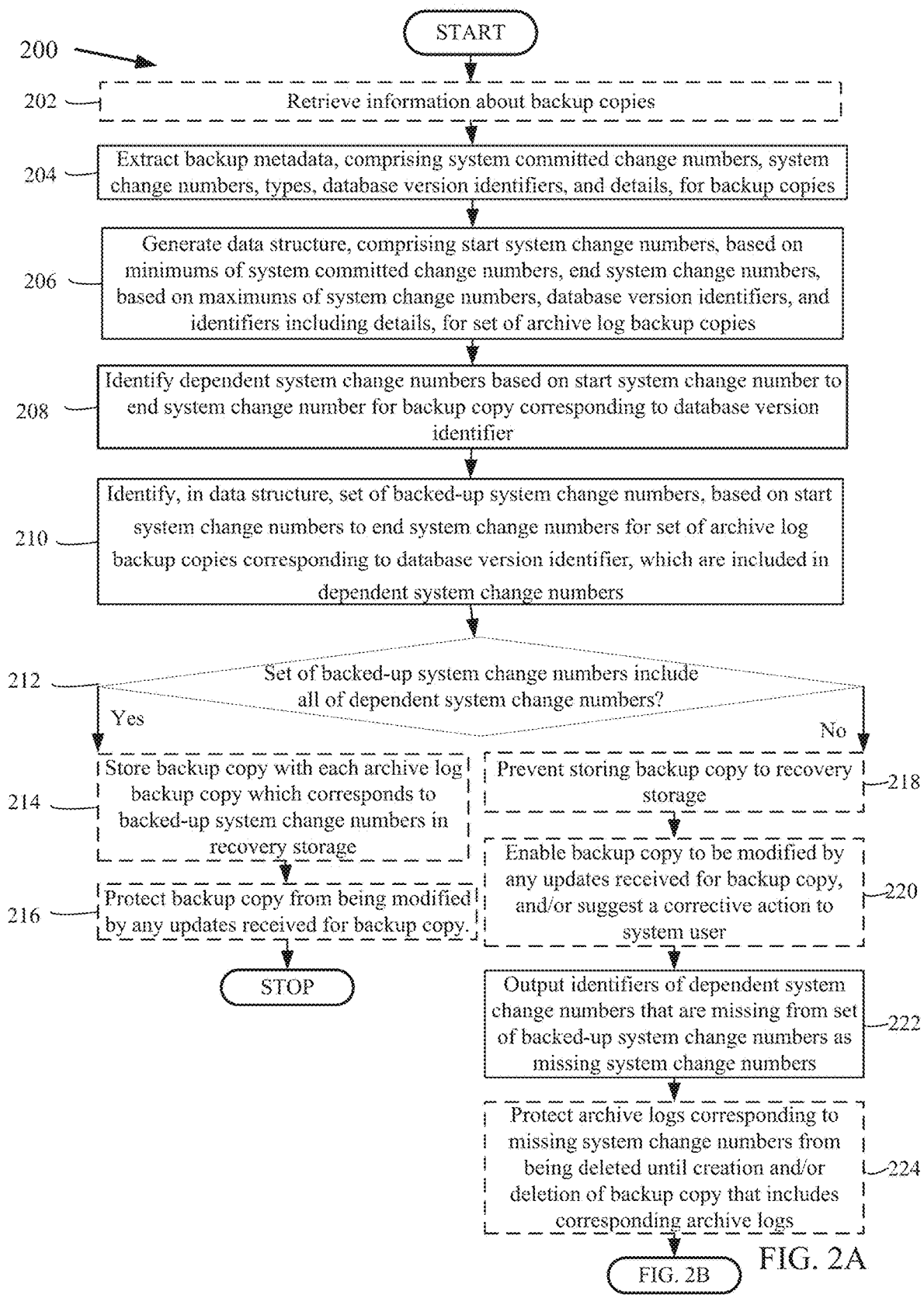
FIGS. 2A-B are a flowchart that illustrates a method of dynamically updating database archive log dependencies and backup copy recoverability, under an embodiment.
Figure 2B:
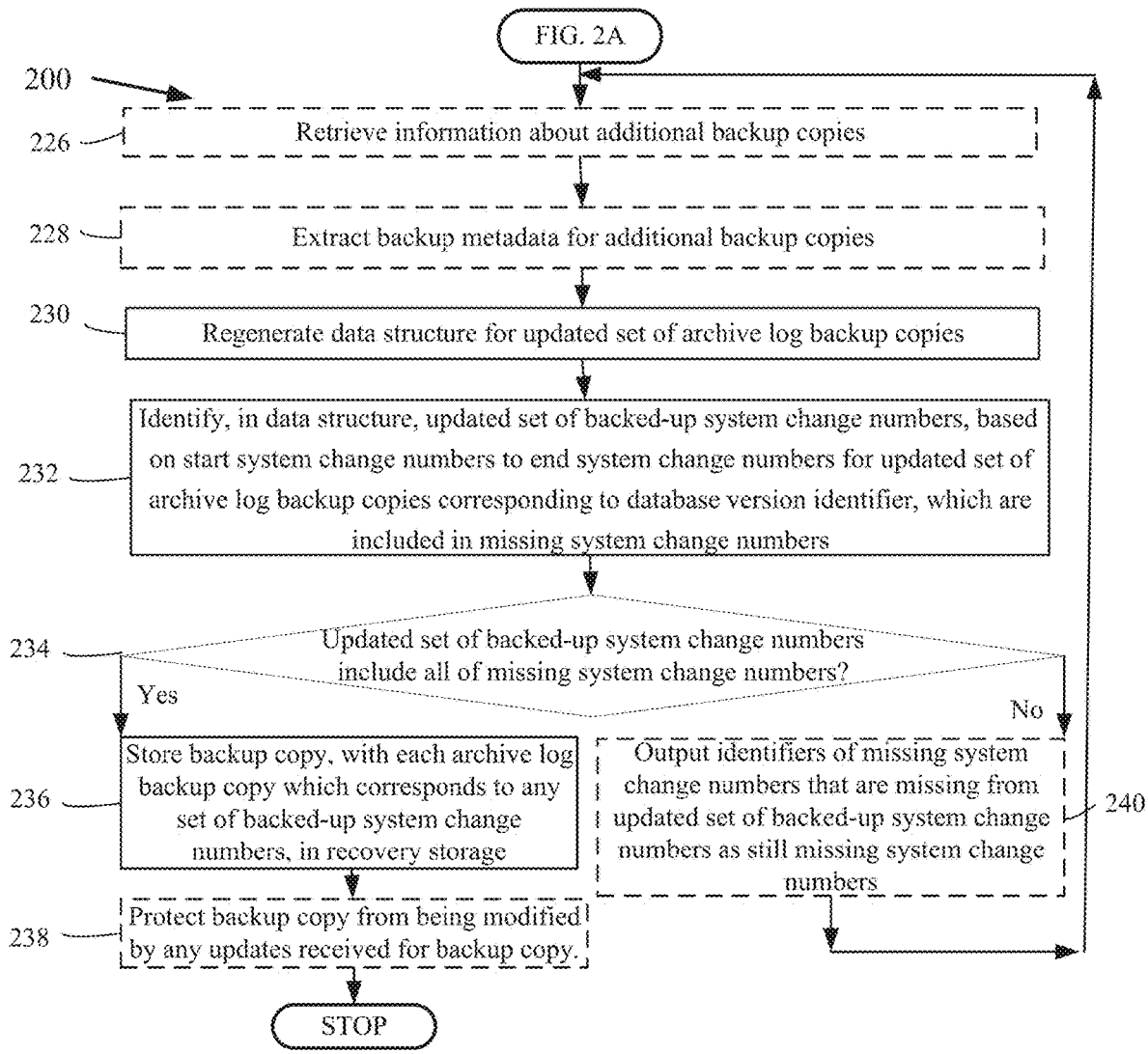

Although FIGS. 2A-B depict the blocks 202-240 occurring in a specific order, the blocks 202-240 may occur in another order. In other implementations, each of the blocks 202-240 may also be executed in combination with other blocks and/or some blocks may be divided into a different set of blocks.

Figure 3:
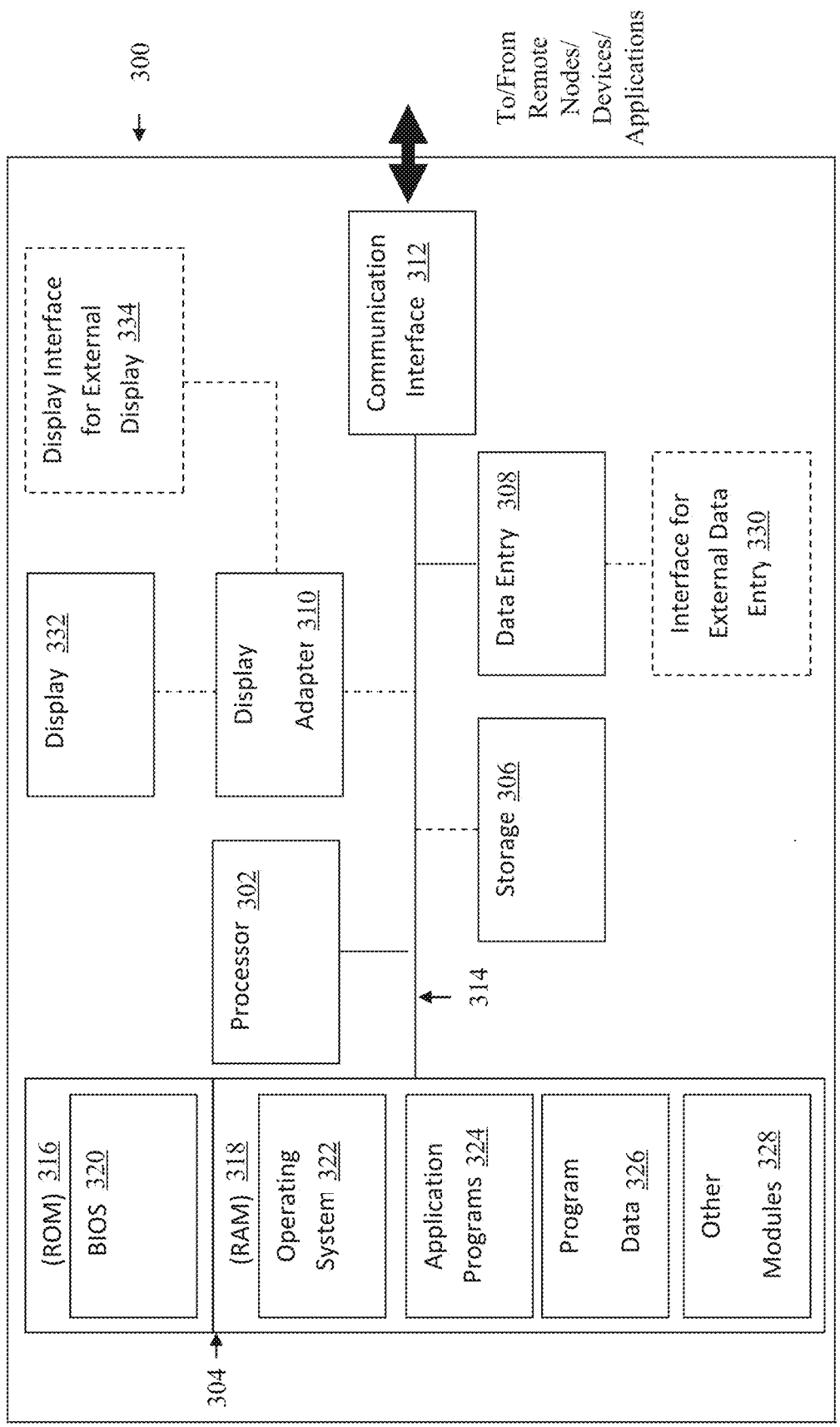
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for dynamically updating database archive log dependencies and backup copy recoverability, comprising:
   one or more processors; and
   a non-transitory computer readable medium storing a plurality of instructions, which when executed, cause the one or more processors to:
   extract backup metadata, comprising system committed change numbers, system change numbers, types, database version identifiers, and details, for backup copies;
   generate a data structure, comprising start system change numbers, based on minimums of the system committed change numbers, end system change numbers, based on maximums of the system change numbers, the database version identifiers, and identifiers including the details, for the backup copies which are a set of archive log backup copies;
   identify dependent system change numbers, based on a start system change number to an end system change number for a backup copy corresponding to a database version identifier;
   identify, in the data structure, a set of backed-up system change numbers, based on the start system change numbers to the end system change numbers for the set of archive log backup copies corresponding to the database version identifier, which are included in the dependent system change numbers;
   output identifiers of the dependent system change numbers that are missing from the backed-up system change numbers as missing system change numbers, in response to a determination that the set of backed-up system change numbers do not include all of the dependent system change numbers;
   regenerate the data structure for an updated set of archive log backup copies;
   identify, in the regenerated data structure, an updated set of backed-up system change numbers, based on the start system change numbers to the end system change numbers for the updated set of archive log backup copies corresponding to the database version identifier, which are included in the missing system change numbers; and store the backup copy, with each archive log backup copy which corresponds to any set of backed-up system change numbers, in recovery storage, in response to a determination that the updated set of backed-up system change numbers include all of the missing system change numbers.

2. The system of claim 1, wherein the plurality of instructions further causes the processor to retrieve information about the backup copies, wherein retrieving information about the backup copies comprises communicating a discovery request for application resources between a backup server and an application host, the backup copy comprises one of a full backup copy, an incremental cumulative backup copy, and an incremental differential backup copy, and storing in recovery storage comprises at least one of replicating and moving to the recovery storage.

3. The system of claim 1, wherein the plurality of instructions further causes the processor to respond to the determination that the set of backed-up system change numbers do not include all of the dependent system change numbers by at least one of preventing storing the backup copy to the recovery storage, enabling the backup copy to be modified by any updates received for the backup copy, suggesting a corrective action to a system user, and protecting archive logs corresponding to the missing system change numbers from being deleted until one of a creation and a deletion of a backup copy that includes the corresponding archive logs.

4. The system of claim 1, wherein the plurality of instructions further causes the processor to respond to a determination that the set of backed-up system change numbers includes all of the dependent system change numbers by at least one of storing the backup copy, with each archive log backup copy which corresponds to the set of backed-up system change numbers, in the recovery storage, and protecting the backup copy from being modified by any updates received for the backup copy.

5. The system of claim 1, wherein the plurality of instructions further causes the processor to respond to the determination that the set of backed-up system change numbers do not include all of the dependent system change numbers by at least one of retrieving the information about additional backup copies, and extracting the backup metadata for the additional backup copies.

6. The system of claim 1, wherein the plurality of instructions further causes the processor to output identifiers of the missing system change numbers that are missing from the updated set of backed-up system change numbers as still missing system change numbers, in response to the determination that the updated set of backed-up system change numbers does not include all of the missing system change numbers.

7. The system of claim 1, wherein the plurality of instructions further causes the processor to protect the backup copy from being modified by any updates received for the backup copy, in response to a determination that the updated set of backed-up system change numbers includes all of the missing system change numbers.

8. A computer-implemented method for dynamically updating database archive log dependencies and backup copy recoverability, the computer-implemented method comprising:

extracting backup metadata, comprising system committed change numbers, system change numbers, types, database version identifiers, and details, for backup copies;

generating a data structure, comprising start system change numbers, based on minimums of the system committed change numbers, end system change numbers, based on maximums of the system change numbers, the database version identifiers, and identifiers including the details, for the backup copies which are a set of archive log backup copies;

identifying dependent system change numbers, based on a start system change number to an end system change number for a backup copy corresponding to a database version identifier;

identifying, in the data structure, a set of backed-up system change numbers, based on the start system change numbers to the end system change numbers for the set of archive log backup copies corresponding to the database version identifier, which are included in the dependent system change numbers;

outputting identifiers of the dependent system change numbers that are missing from the backed-up system change numbers as missing system change numbers, in response to a determination that the set of backed-up system change numbers do not include all of the dependent system change numbers;

regenerating the data structure for an updated set of archive log backup copies;

identifying, in the regenerated data structure, an updated set of backed-up system change numbers, based on the start system change numbers to the end system change numbers for the updated set of archive log backup copies corresponding to the database version identifier, which are included in the missing system change numbers; and storing the backup copy, with each archive log backup copy which corresponds to any set of backed-up system change numbers, in recovery storage, in response to a determination that the updated set of backed-up system change numbers include all of the missing system change numbers.

9. The computer-implemented method of claim 8, wherein the computer-implemented method further comprises retrieving information about the backup copies, wherein retrieving information about the backup copies comprises communicating a discovery request for application resources between a backup server and an application host, the backup copy comprises one of a full backup copy, an incremental cumulative backup copy, and an incremental differential backup copy, and storing in recovery storage comprises at least one of replicating and moving to the recovery storage.

10. The computer-implemented method of claim 8, wherein the computer-implemented method further comprises responding to the determination that the set of backed-up system change numbers do not include all of the dependent system change numbers by at least one of preventing storing the backup copy to the recovery storage, enabling the backup copy to be modified by any updates received for the backup copy, suggesting a corrective action to a system user, and protecting archive logs corresponding to the missing system change numbers from being deleted until one of a creation and a deletion of a backup copy that includes the corresponding archive logs.

11. The computer-implemented method of claim 8, wherein the computer-implemented method further comprises responding to a determination that the set of backed-up system change numbers includes all of the dependent system change numbers by at least one of storing the backup copy, with each archive log backup copy which corresponds to the set of backed-up system change numbers, in the recovery storage, and protecting the backup copy from being modified by any updates received for the backup copy.

12. The computer-implemented method of claim 8, wherein the computer-implemented method further comprises responding to the determination that the set of backed-up system change numbers do not include all of the dependent system change numbers by at least one of retrieving the information about additional backup copies, and extracting the backup metadata for the additional backup copies.

13. The computer-implemented method of claim 8, wherein the computer-implemented method further comprises outputting identifiers of the missing system change numbers that are missing from the updated set of backed-up system change numbers as still missing system change numbers, in response to the determination that the updated set of backed-up system change numbers do not include all of the missing system change numbers.

14. The computer-implemented method of claim 8, wherein the computer-implemented method further comprises protecting the backup copy from being modified by any updates received for the backup copy, in response to a determination that the updated set of backed-up system change numbers includes all of the missing system change numbers.

15. A computer program product, comprising a non-transitory computer-readable medium having a computer-readable program code embodied therein to be executed by one or more processors, the program code including instructions to:
    extract backup metadata, comprising system committed change numbers, system change numbers, types, database version identifiers, and details, for backup copies;
    generate a data structure, comprising start system change numbers, based on minimums of the system committed change numbers, end system change numbers, based on maximums of the system change numbers, the database version identifiers, and identifiers including the details, for the backup copies which are a set of archive log backup copies;
    identify dependent system change numbers, based on a start system change number to an end system change number for a backup copy corresponding to a database version identifier;
    identify, in the data structure, a set of backed-up system change numbers, based on the start system change numbers to the end system change numbers for the set of archive log backup copies corresponding to the database version identifier, which are included in the dependent system change numbers;
    output identifiers of the dependent system change numbers that are missing from the backed-up system change numbers as missing system change numbers, in response to a determination that the set of backed-up system change numbers do not include all of the dependent system change numbers;
    regenerate the data structure for an updated set of archive log backup copies;
    identify in the regenerated data structure, an updated set of backed-up system change numbers, based on the start system change numbers to the end system change numbers for the updated set of archive log backup copies corresponding to the database version identifier, which are included in the missing system change numbers; and
    store the backup copy, with each archive log backup copy which corresponds to any set of backed-up system change numbers, in recovery storage, in response to a determination that the updated set of backed-up system change numbers include all of the missing system change numbers.

16. The computer program product of claim 15, wherein the program code includes further instructions to retrieve information about the backup copies, wherein retrieving information about the backup copies comprises communicating a discovery request for application resources between a backup server and an application host, the backup copy comprises one of a full backup copy, an incremental cumulative backup copy, and an incremental differential backup copy, and storing in recovery storage comprises at least one of replicating and moving to the recovery storage.

17. The computer program product of claim 15, wherein the program code includes further instructions to respond to the determination that the set of backed-up system change numbers do not include all of the dependent system change numbers by at least one of preventing storing the backup copy to the recovery storage, enabling the backup copy to be modified by any updates received for the backup copy, suggesting a corrective action to a system user, protecting archive logs corresponding to the missing system change numbers from being deleted until one of a creation and a deletion of a backup copy that includes the corresponding archive logs, retrieving the information about additional backup copies, and extracting the backup metadata for the additional backup copies.

18. The computer program product of claim 15, wherein the program code includes further instructions to respond to a determination that the set of backed-up system change numbers includes all of the dependent system change numbers by at least one of storing the backup copy, with each archive log backup copy which corresponds to the set of backed-up system change numbers, in the recovery storage, and protecting the backup copy from being modified by any updates received for the backup copy.

19. The computer program product of claim 15, wherein the program code includes further instructions to output identifiers of the missing system change numbers that are missing from the updated set of backed-up system change numbers as still missing system change numbers, in response to the determination that the updated set of backed-up system change numbers does not include all of the missing system change numbers.

20. The computer program product of claim 15, wherein the program code includes further instructions to protect the backup copy from being modified by any updates received for the backup copy, in response to a determination that the updated set of backed-up system change numbers includes all of the missing system change numbers.

\* \* \* \* \*